(12) United States Patent
Yokoyama et al.

(10) Patent No.: US 12,744,165 B2
(45) Date of Patent: Sep. 22, 2026

(54) CAPACITOR, ELECTRIC CIRCUIT, CIRCUIT BOARD, AND APPARATUS

(71) Applicant: Panasonic Intellectual Property Management Co., Ltd., Osaka (JP)

(72) Inventors: Tomoyasu Yokoyama, Osaka (JP); Kosei Ohura, Osaka (JP); Ryosuke Kikuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 143 days.

(21) Appl. No.: 18/960,908

(22) Filed: Nov. 26, 2024

(65) Prior Publication Data

US 2025/0087425 A1 Mar. 13, 2025

Related U.S. Application Data

(63) Continuation of application No. PCT/JP2023/017190, filed on May 2, 2023.

(30) Foreign Application Priority Data

May 31, 2022 (JP) ................................ 2022-089286

(51) Int. Cl.
*H01G 4/30* (2006.01)
*H01G 4/12* (2006.01)
*H01G 9/07* (2006.01)

(52) U.S. Cl.
CPC ................ *H01G 9/07* (2013.01); *H01G 4/12* (2013.01); *H01G 4/1218* (2013.01); *H01G 4/30* (2013.01)

(58) Field of Classification Search
None
See application file for complete search history.

(56) References Cited

U.S. PATENT DOCUMENTS 5,736,759 A 4/1998 Haushalter
10,941,165 B2 * 3/2021 Luther ...................... C07F 7/24
11,174,276 B2 * 11/2021 Zhu ...................... C01G 19/006
11,765,964 B2 * 9/2023 Palmstrom ........... H01G 9/0036 257/40
2018/0351019 A1 * 12/2018 Zhu ...................... B32B 15/043
2019/0235096 A1 8/2019 Kanatzidis et al.

(Continued)

FOREIGN PATENT DOCUMENTS

JP H10-093031 A 4/1998
JP 2016-171152 A 9/2016
JP 2019-021795 A 2/2019

OTHER PUBLICATIONS

International Search Report dated Jul. 18, 2023 issued in International Patent Application No. PCT/JP2023/017190, with English translation.

(Continued)

*Primary Examiner* — Dion R. Ferguson
(74) *Attorney, Agent, or Firm* — RIMON P.C.

(57) ABSTRACT

A capacitor includes a first electrode, a second electrode, and a dielectric. The dielectric is disposed between the first electrode and the second electrode. The dielectric includes a compound having an inverted perovskite structure. The inverted perovskite structure of this compound has a portion in which a cation is present at each vertex of corner-sharing octahedra and an anion is present at a center of each of the corner-sharing octahedra.

22 Claims, 22 Drawing Sheets

(56) References Cited

U.S. PATENT DOCUMENTS

| | | | | |
|---|---|---|---|---|
| 2020/0055882 | A1* | 2/2020 | Luther | C07F 7/24 |
| 2020/0148711 | A1* | 5/2020 | Leijtens | C07F 13/005 |
| 2020/0294728 | A1* | 9/2020 | Zhu | H01G 9/2009 |
| 2022/0037597 | A1* | 2/2022 | Palmstrom | H01G 9/0036 |
| 2022/0235076 | A1* | 7/2022 | Zhu | C07F 7/24 |
| 2025/0087418 | A1* | 3/2025 | Yokoyama | H01G 4/08 |
| 2025/0087425 | A1* | 3/2025 | Yokoyama | H01G 4/33 |

OTHER PUBLICATIONS

Ju-Hyun Jung et al., "Metal-Halide Perovskite Design for Next-Generation Memories: First-Principles Screening and Experimental Verification", Advanced Science, vol. 7, No. 16, 2001367, pp. 1-8, 2020.

Zhong-Xia Wang et al., "Fluoridation Achieved Antiperovskite Molecular Ferroelectric in [(CH3)2(F—CH2CH2)NH]3 (CdCl3)(CdCl4)", Journal of the American Chemical Society, vol. 141, Issue 10, pp. 4372-4378, 2019.

Li-Mo Wang, "Relationship between Intrinsic Breakdown Field and Bandgap of Materials", 2006 25th International Conference on Microelectronics. Proceedings, pp. 615-618, 2006.

Wenhao Sun et al., "The thermodynamic scale of inorganic crystalline metastability", Science Advances, vol. 2, Issue 11, e1600225, pp. 1-8, 2016.

* cited by examiner

CAPACITOR, ELECTRIC CIRCUIT, CIRCUIT BOARD, AND APPARATUS

This application is a continuation of PCT/JP2023/017190 filed on May 2, 2023, which claims foreign priority of Japanese Patent Application No. 2022-089286 filed on May 31, 2022, the entire contents of both of which are incorporated herein by reference.

BACKGROUND OF THE INVENTION

1. Field of the Invention

The present invention relates to a capacitor, an electrical circuit, a circuit board, and an apparatus.

2. Description of Related Art

Conventionally, compounds having a perovskite structure are included in devices such as solar cells.

For example, JP 2016-171152 A describes a ferroelectric memory device in which a ferroelectric layer is sandwiched between a pair of electrodes. The ferroelectric layer includes a certain halide-based organic-inorganic hybrid perovskite compound or a certain inorganic perovskite compound. Examples of the halide organic-inorganic hybrid perovskite compound include $CH_3NH_3PbI_3$, $C_2H_5NH_3PbI_4$, $CH_3NH_3SnI_3$, and $C_2H_5NH_3SnI_4$. Examples of the inorganic perovskite compound include $CsSnI_3$.

JP 2019-021795 A describes using an antiperovskite solid electrolyte as a solid electrolyte configured to be included in a given capacitor.

"Fluoridation Achieved Antiperovskite Molecular Ferroelectric in [(CH3)2(F—CH2CH2)NH]3($CdCl_3$)($CdCl_4$)" (Non Patent Literature 1) by Zhong-Xia Wang, Yi Zhang, Yuan-Yuan Tang, Peng-Fei Li, and Ren-Gen Xiong (J. Am. Chem. Soc. 2019, 141, 10, 4372-4378) describes a ferroelectric having an inverted perovskite structure represented by $[(CH_3)_2(F—CH_2CH_2)NH]_3CdCl_3)(CdCl_4)$. It is understood that in this inverted perovskite structure, an anion is present at the center of each of face-sharing octahedra and a cation is present at each vertex of the octahedra.

SUMMARY OF THE INVENTION

The present disclosure provides a capacitor including a dielectric including a compound having an inverted perovskite structure, the capacitor being advantageous to achieve a high capacitance.

A capacitor of the present disclosure includes:

a first electrode;

a second electrode; and a dielectric disposed between the first electrode and the second electrode, wherein the dielectric includes a compound having an inverted perovskite structure, and the inverted perovskite structure has a portion in which a cation is present at each vertex of corner-sharing octahedra and an anion is present at a center of each of the corner-sharing octahedra.

The present disclosure can provide a capacitor including a dielectric including a compound having an inverted perovskite structure, the capacitor being advantageous to achieve a high capacitance.

DETAILED DESCRIPTION (Findings on which the Present Disclosure is Based)

Size reduction, increase in integration density, and increase in operating frequency of electronic circuits have been promoted in recent years along with size reduction and advancement of functionality of electronic devices. Size reduction and performance increase are required also of electronic components to be included in electronic circuits. It is thought that, for example, provision of a small-sized capacitor having a high capacitance will be able to contribute to size reduction and performance increase of electronic components. The capacitance of a capacitor depends on the relative permittivity of a dielectric in the capacitor. The higher the relative permittivity is, the higher the capacitance becomes.

Figure 1:
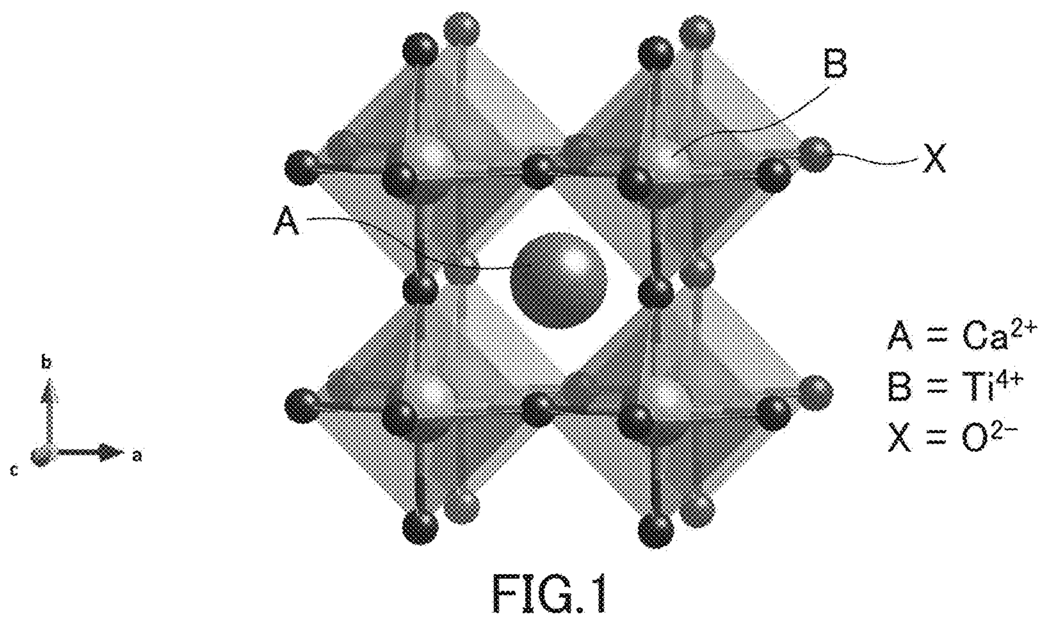
FIG. 1 shows a crystal structure of $CaTiO_3$.
Figure 2:
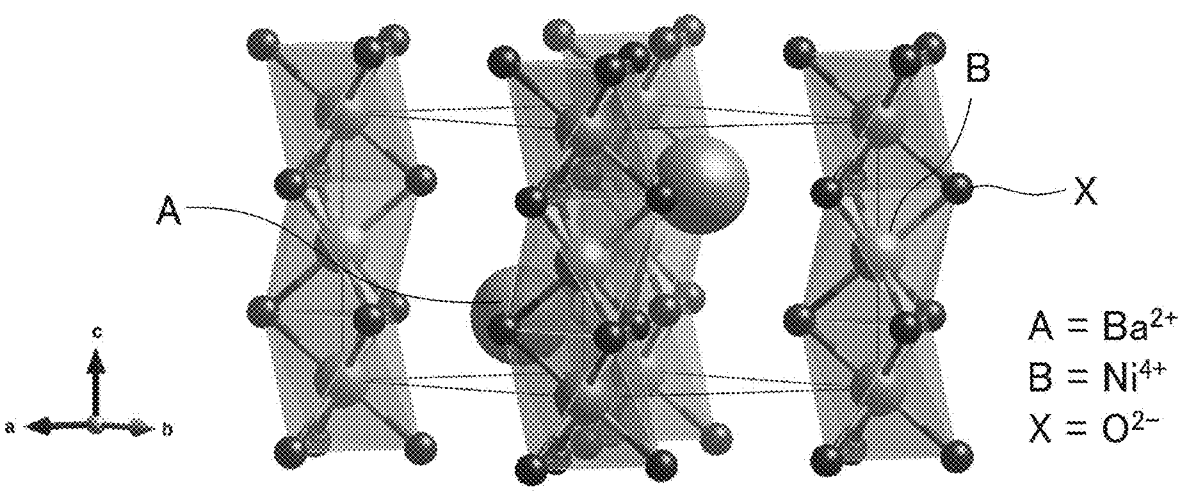
FIG. 2 shows a crystal structure of $BaNiO_3$.

A $CaTiO_3$-type crystal structure and a $BaNiO_3$-type crystal structure are perovskite structures having a composition represented by $ABX_3$. FIGS. 1 and 2 respectively show crystal structures of $CaTiO_3$ and $BaNiO_3$. As shown in FIG. 1, in the crystal structure of $CaTiO_3$, $Ca^{2+}$ is present at the A site, $Ti^{4+}$ is present at the B site, and $O^{2-}$ is present at the X site. In the crystal structure of $CaTiO_3$, six $O^{2-}$ ions are coordinated around one $Ti^{4+}$ ion, the $Ti^{4+}$ ion is present at the center of each of corner-sharing octahedra, and $O^{2-}$ is present at each vertex of the octahedra. As shown in FIG. 2, in the crystal structure of $BaNiO_3$, $Ba_{2+}$ is present at the A site, $Ni^{4+}$ is present at the B site, and $O^{2-}$ is present at the X site. In the crystal structure of $BaNiO_3$, six $O^{2-}$ ions are coordinated around one $Ni^{4+}$ ion, the $Ni^{4+}$ ion is present at the center of each of face-sharing octahedra, and $O^{2-}$ is present at each vertex of the octahedra.

The relative permittivity of a compound having a perovskite structure at room temperature is not likely to be high, and it is difficult to increase the capacitance of a capacitor including a dielectric including such a compound. In a capacitor described in JP 2019-021795 A, a compound having an inverted perovskite structure is used as a solid electrolyte; the compound having an inverted perovskite structure is not supposed to be used as a dielectric of the capacitor. Incidentally, the capacitor described in JP 2019-021795 A uses ionic conduction, which is slow in response speed compared to polarization, to store charges; hence it is thought that the capacitor is not likely to exhibit high power. It is understood that in an inverted perovskite structure of a ferroelectric described in Non Patent Literature 1, an anion is present at the center of each of face-sharing octahedra and a cation is present at each vertex of the octahedra. It is hard to say that the ferroelectric described in Non Patent Literature 1 has a high relative permittivity at room temperature. In Non Patent Literature 1, this ferroelectric is not supposed to be included in a capacitor. It is hard to say that this ferroelectric is suitable for capacitors in light of the relative permittivity of the ferroelectric at room temperature.

In view of these circumstances, the present inventors made intensive studies to find whether it is possible to increase the capacitance of a capacitor including a dielectric including a compound having an inverted perovskite structure. Through the intensive studies, the present inventors newly found that a dielectric including a compound having a particular inverted perovskite structure can have a high relative permittivity. On the basis of this new finding, the present inventors have devised the capacitor of the present disclosure.

Summary of One Aspect According to the Present Disclosure

A capacitor according to a first aspect of the present disclosure includes:

a first electrode;

a second electrode; and a dielectric disposed between the first electrode and the second electrode, wherein the dielectric includes a compound having an inverted perovskite structure, and the inverted perovskite structure has a portion in which a cation is present at each vertex of corner-sharing octahedra and an anion is present at a center of each of the corner-sharing octahedra.

According to the first aspect, it is likely that the dielectric has a high relative permittivity and the capacitor has a high capacitance.

According to a second aspect of the present disclosure, for example, in the capacitor according to the first aspect, the compound may include an ion of an element in at least one group selected from the group consisting of Group 13, Group 14, and Group 15. According to the second aspect, it is more likely that the dielectric has a high relative permittivity and the capacitor has a high capacitance.

According to a third aspect of the present disclosure, for example, in the capacitor according to the second aspect, the ion may have a lone pair. According to the third aspect, the electrons forming the lone pair are less likely to be bonded to a nearby ion. This is likely to make an electronic state of such an ion unstable and allow the dielectric to have a desired crystal structure. Hence, it is more likely that the dielectric has a high relative permittivity and the capacitor has a high capacitance.

According to a fourth aspect of the present disclosure, for example, in the capacitor according to any one of the first to third aspects, the compound may include at least one selected from the group consisting of $In^{+}$, $Tl^{+}$, $Ge^{2+}$, $Sn^{2+}$, $Pb^{2+}$, $Sb^{3+}$, and $Bi^{3+}$. According to the fourth aspect, it is more likely that the dielectric has a high relative permittivity and the capacitor has a high capacitance.

According to a fifth aspect of the present disclosure, for example, in the capacitor according to any one of the first to fourth aspects, the compound may have a composition represented by $DE_2Q_5$, where D and E may each be a cation, and Q may be an anion. According to the fifth aspect, it is more likely that the dielectric has a high relative permittivity and the capacitor has a high capacitance.

According to a sixth aspect of the present disclosure, for example, in the capacitor according to any one of the first to fourth aspects, the compound may have a composition represented by $DE_2Q_4R$, where D and E may each be a cation, and Q and R may each be an anion. According to the sixth aspect, it is more likely that the dielectric has a high relative permittivity and the capacitor has a high capacitance.

According to a seventh aspect of the present disclosure, for example, in the capacitor according to any one of the first to fourth aspects, the compound may have a composition represented by $DEGQ_5$, where D, E, and G may each be a cation, and Q may be an anion. According to the seventh aspect, it is more likely that the dielectric has a high relative permittivity and the capacitor has a high capacitance.

According to an eighth aspect of the present disclosure, for example, in the capacitor according to any one of the first to fourth aspects, the compound may have a composition represented by $DEGQ_4R$, where D, E, and G may each be a cation, and Q and R may each be an anion. According to the eighth aspect, it is more likely that the dielectric has a high relative permittivity and the capacitor has a high capacitance.

According to a ninth aspect of the present disclosure, for example, in the capacitor according to any one of the first to fourth aspects, the compound may have a composition represented by $DEG_4Q_{10}$, where D, E, and G may each be a cation, and Q may be an anion. According to the ninth aspect, it is more likely that the dielectric has a high relative permittivity and the capacitor has a high capacitance.

According to a tenth aspect of the present disclosure, for example, in the capacitor according to any one of the first to fourth aspects, the compound may have a composition represented by $DEG_4Q_8R_2$, where D, E, and G may each be a cation, and Q may be an anion. According to the tenth aspect, it is more likely that the dielectric has a high relative permittivity and the capacitor has a high capacitance.

According to an eleventh aspect of the present disclosure, for example, in the capacitor according to any one of the first to fourth aspects, the compound may have a composition represented by $D_3EQ_5$, where D and E may each be a cation, and Q may be an anion. According to the eleventh aspect, it is more likely that the dielectric has a high relative permittivity and the capacitor has a high capacitance.

According to a twelfth aspect of the present disclosure, for example, in the capacitor according to any one of the first to fourth aspects, the compound may have a composition represented by $D_3EQ_4R$, where D and E may each be a cation, and Q and R may each be an anion. According to the twelfth aspect, it is more likely that the dielectric has a high relative permittivity and the capacitor has a high capacitance.

According to a thirteenth aspect of the present disclosure, for example, in the capacitor according to any one of the first to fourth aspects, the compound may have a composition represented by $DE_2GQ_5$, where D, E, and G may each be a cation, and Q may be an anion. According to the thirteenth aspect, it is more likely that the dielectric has a high relative permittivity and the capacitor has a high capacitance.

According to a fourteenth aspect of the present disclosure, for example, in the capacitor according to any one of the first to fourth aspects, the compound may have a composition represented by $D_6EQ_{10}$, where D and E may each be a cation, and Q may be an anion. According to the fourteenth aspect, it is more likely that the dielectric has a high relative permittivity and the capacitor has a high capacitance.

According to a fifteenth aspect of the present disclosure, for example, in the capacitor according to any one of the first to fourth aspects, the compound may have a composition represented by $D_6EQ_8R_2$, where D and E may each be a cation, and Q and R may each be an anion. According to the fifteenth aspect, it is more likely that the dielectric has a high relative permittivity and the capacitor has a high capacitance.

According to a sixteenth aspect of the present disclosure, for example, in the capacitor according to any one of the first to fourth aspects, the compound may have a composition represented by $D_2E_4GQ_5$, where D, E, and G may each be a cation, and Q may be an anion. According to the sixteenth aspect, it is more likely that the dielectric has a high relative permittivity and the capacitor has a high capacitance.

According to a seventeenth aspect of the present disclosure, for example, in the capacitor according to any one of the first to fourth aspects, the compound may have a composition represented by $DE_2GQ_4R$, where D, E, and G may each be a cation, and Q and R may each be an anion. According to the seventeenth aspect, it is more likely that the dielectric has a high relative permittivity and the capacitor has a high capacitance.

According to an eighteenth aspect of the present disclosure, for example, in the capacitor according to any one of the first to fourth aspects, the compound may have a composition represented by $D_2E_4GQ_8R_2$, where D, E, and G may each be a cation, and Q and R may each be an anion. According to the eighteenth aspect, it is more likely that the dielectric has a high relative permittivity and the capacitor has a high capacitance.

According to a nineteenth aspect of the present disclosure, for example, in the capacitor according to any one of the first to fourth aspects, the compound may have a composition represented by $D_2E_4Q_7$, where D and E may each be a cation, and Q may be an anion. According to the nineteenth aspect, it is more likely that the dielectric has a high relative permittivity and the capacitor has a high capacitance.

An electrical circuit according to a twentieth aspect of the present disclosure includes the capacitor according to any one of the first to nineteenth aspects. According to the twentieth aspect, it is likely that the capacitor has a high capacitance and the electrical circuit exhibits a desired performance.

A circuit board according to a twenty-first aspect of the present disclosure includes the capacitor according to any one of the first to nineteenth aspects. According to the twenty-first aspect, it is likely that the capacitor has a high capacitance and the circuit board exhibits a desired performance.

An apparatus according to a twenty-second aspect of the present disclosure includes the capacitor according to any one of the first to nineteenth aspects. According to the twenty-second aspect, it is likely that the capacitor has a high capacitance and the apparatus exhibits a desired performance.

Embodiments

Embodiments of the present disclosure will be described hereinafter with reference to the drawings. The present disclosure is not limited to the following embodiments.

Figure 3:
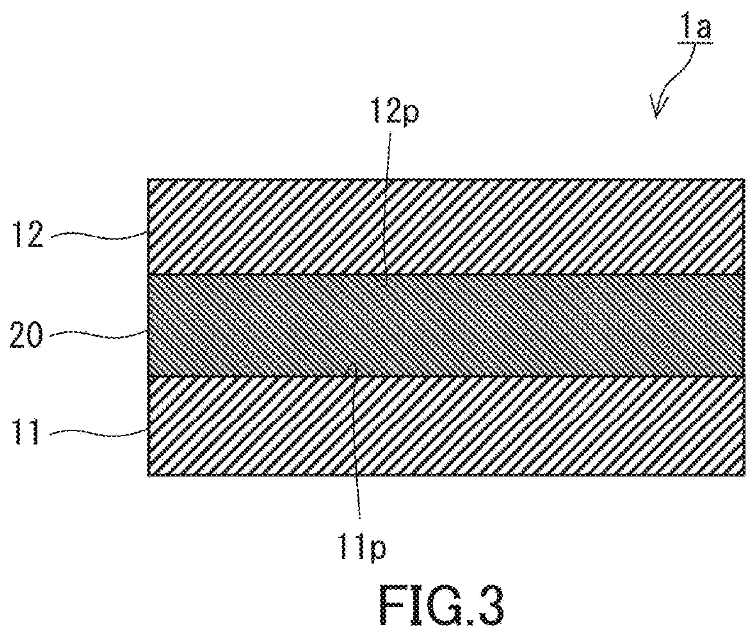
FIG. 3 shows an example of a capacitor of the present disclosure.

FIG. 3 is a cross-sectional view showing an example of a capacitor of the present disclosure. As shown in FIG. 3, a capacitor 1*a* includes a first electrode 11, a second electrode 12, and a dielectric 20. The dielectric 20 is disposed between the first electrode 11 and the second electrode 12. The dielectric 20 includes a compound having an inverted perovskite structure. The inverted perovskite structure of this compound has a portion in which a cation is present at each vertex of corner-sharing octahedra and an anion is present at a center of each of the octahedra. This compound includes, for example, an ionic crystal.

Figure 4:
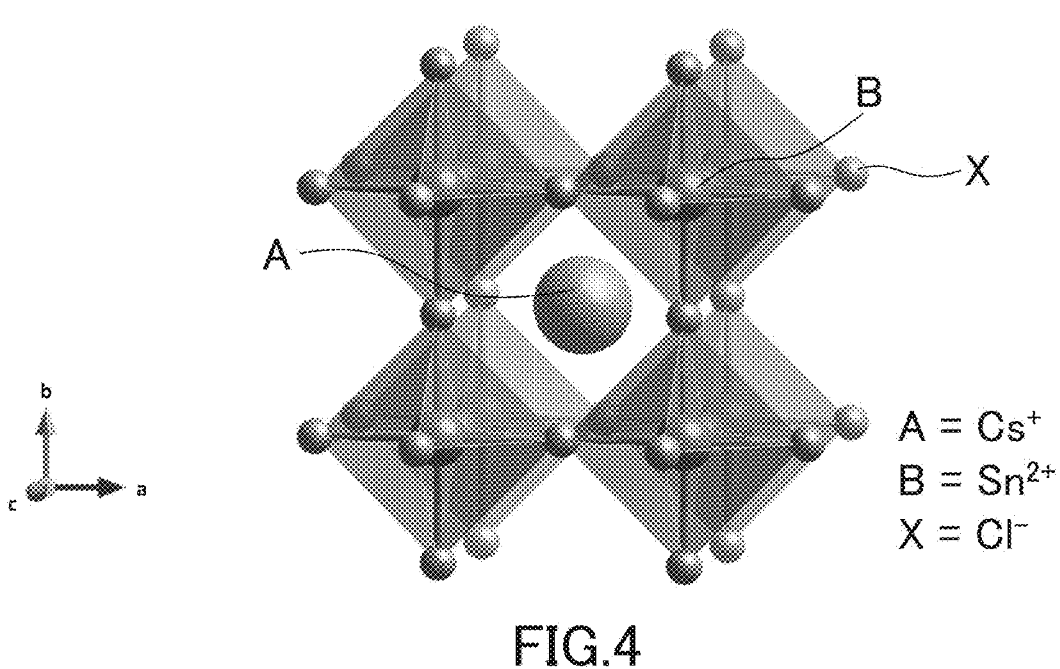
FIG. 4 shows a crystal structure of $CsSnCl_3$.
Figure 5A:
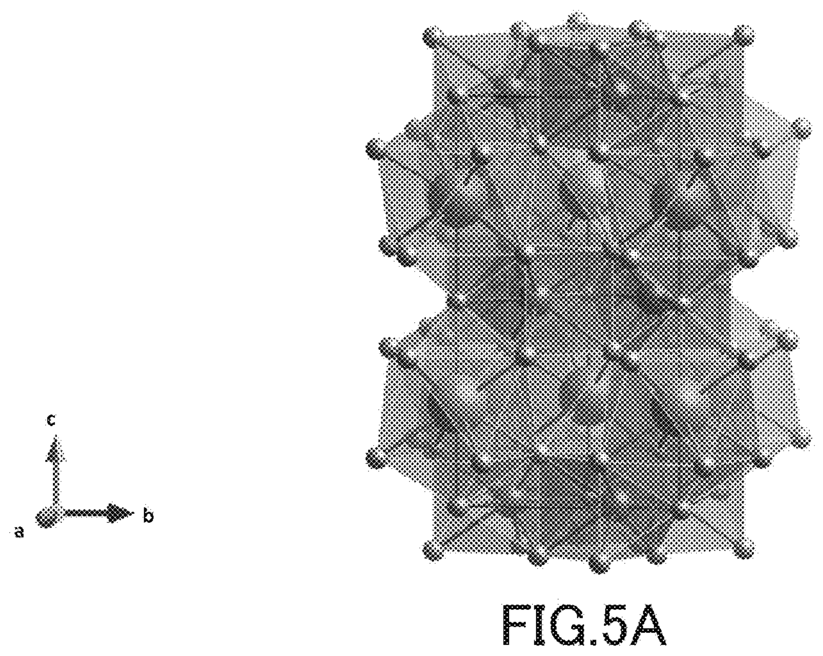
FIG. 5A shows a crystal structure of $CsSn_2Cl_5$.
Figure 5B:
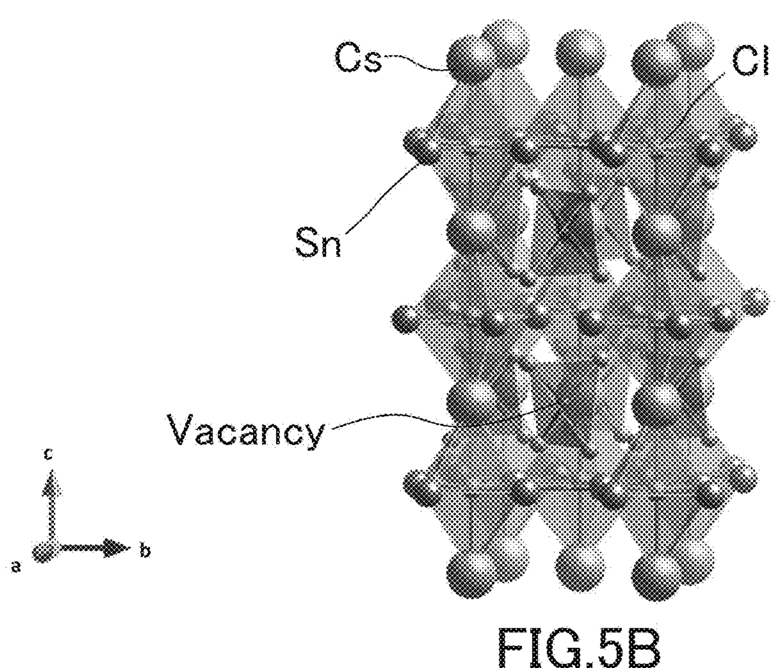
FIG. 5B shows the crystal structure of $CsSn_2Cl_5$ as anion-centered coordination polyhedra.
Figure 5C:
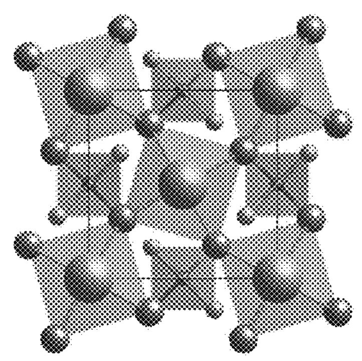
FIG. 5C shows the crystal structure shown in FIG. 5B and viewed along the negative c-axis direction.

FIG. 4 shows a crystal structure of $CsSnCl_3$. $CsSnCl_3$ has a perovskite structure. FIG. 5A shows a crystal structure of $CsSn_2Cl_5$. FIG. 5B shows the crystal structure of $CsSn_2Cl_5$ as anion-centered coordination polyhedra. FIG. 5C shows the crystal structure shown in FIG. 5B and viewed along the negative c-axis direction. $CsSn_2Cl_5$ has an inverted perovskite structure. In an inverted perovskite structure, positions of a cation and an anion in $ABX_3$ are opposite to those in a standard perovskite compound. In other words, a charge of an ion at a particular site in a perovskite compound and a charge of an ion at the particular site in a compound having an inverted perovskite structure are opposite in sign. As shown in FIG. 4, in $CsSnCl_3$, $Cs^+$ is present at the A site, $Sn^{2+}$ is present at the B site, and $Cl^-$ is present at the X site. On the other hand, as shown in FIG. 5B, in $CsSn_2Cl_5$, $Cl_4^{4-}$ is present at the A site, $Cl^-$ is present at the B site, and $Cs^+$ or $Sn^{2+}$ is present at the X site. In other words, $CsSn_2Cl_5$ is expressed as $(Cl_4)Cl(CsSn_2)$ in $ABX_3$. As shown in FIG. 5B, $CsSn_2Cl_5$ has a portion in which a cation, $Cs^+$ or $Sn^{2+}$, is present at each vertex of corner-sharing octahedra, an anion, $Cl^-$, is present at the center of each of the octahedra. By first-principles calculation, $CsSnCl_3$ was determined to have a relative permittivity of 39.4 and $CsSn_2Cl_5$ was determined to have a relative permittivity of 79.5. Therefore, a compound having an inverted perovskite structure and having a portion in which a cation is present at each vertex of corner-sharing octahedra and an anion is present at the center of each of the octahedra is expected to have a higher relative permittivity than a perovskite compound. Moreover, as described above, it is understood that in the ferroelectric described in Non Patent Literature 1 and having an inverted perovskite structure, an anion is present at the center of each of face-sharing octahedra and a cation is present at each vertex of the octahedra. According to Non Patent Literature 1, this ferroelectric does not have a high relative permittivity at room temperature. Thus, for a high relative permittivity, it is thought to be important that a compound having an inverted perovskite structure has a portion in which a cation is present at each vertex of corner-sharing octahedra and an anion is present at the center of each of the octahedra. According to the studies by the present inventors, it is likely that in an inverted perovskite structure of a compound having such a portion, ions are linearly arranged and polarization is large. Hence, the dielectric 20 is likely to have a high relative permittivity, and the capacitor 1*a* is likely to have a high capacitance.

The cation in the compound included in the dielectric 20 and having an inverted perovskite structure is not limited to a particular ion. The compound includes, for example, an ion of an element in at least one group selected from the group consisting of Group 13, Group 14, and Group 15. In this case, it is more likely that the dielectric 20 has a high relative permittivity and the capacitor 1*a* has a high capacitance.

In the compound included in the dielectric 20 and having an inverted perovskite structure, the ion of the element in at least one group selected from the group consisting of Group 13, Group 14, and Group 15 has, for example, a lone pair. The lone pair is an electron pair formed of paired electrons that belong to a given atom and that are not shared with another atom. For example, $Sn^{2+}$, which is an ion of Sn being an element of Group 14, has a lone pair. $Sn^{2+}$ is formed by stripping Sn of two electrons, and two electrons of $Sn^{2+}$ in the s orbital in the outermost shell form a lone pair. The electrons forming a lone pair are not likely to be bonded to a nearby ion, and can contribute to an unstable electronic state or a special crystal structure. Therefore, when the cation in the dielectric 20 has a lone pair, the dielectric 20 is likely to have a high relative permittivity. Meanwhile, $Sn^{4+}$ is a Sn ion, as is $Sn^{2+}$. $Sn^{4+}$ is formed by stripping Sn of four electrons, and thus the s orbital in the outermost shell is empty. Therefore, $Sn^{4+}$ has no lone pair. In this case, a crystal structure having a small coordination number is likely to be formed, and the relative permittivity of the material is not likely to be high.

For example, every ion of the element in at least one group selected from the group consisting of Group 13, Group 14, and Group 15 in the compound having an inverted perovskite structure may have a lone pair, or only portion of the ion may have a lone pair.

The cation in the compound included in the dielectric 20 and having an inverted perovskite structure includes, for example, at least one selected from the group consisting of $In^+$, $Tl^+$, $Ge^{2+}$, $Sn^{2+}$, $Pb^{2+}$, $Sb^{3+}$, and $Bi^{3+}$. In this case, it is more likely that the dielectric 20 has a high relative permittivity and the capacitor 1*a* has a high capacitance.

The cation in the compound included in the dielectric 20 and having an inverted perovskite structure may include an alkali metal ion such as $Li^+$, $Na^+$, $K^+$, $Rb^+$, or $Cs^+$, or may include an alkaline earth metal ion such as $Ba^{2+}$.

The anion in the compound included in the dielectric 20 and having an inverted perovskite structure is not limited to a particular anion. The anion may be a halogen ion, $O^{2-}$, $S^{2-}$, or a polyatomic ion such as $Cl_4^{4-}$, $(CoCl^4)^{2-}$, $(AlO_4)^{5-}$, $(ZnO_4)^{6-}$, $(SnS_4)^{4-}$, or $(InSTe_2)_2^{6-}$.

Whether a given element in the compound having an inverted perovskite structure is a cation or an anion can be confirmed, for example, by X-ray photoelectron spectroscopy (XPS). It can be concluded that when a binding energy obtained by XPS is lower than that of a simple substance of a metal, a target element is negatively charged and is present as an anion. On the other hand, it can be concluded that when a binding energy obtained by XPS is higher than that of a simple substance of a metal, a target element is positively charged and is present as a cation. Likewise, whether a lone pair is present can be determined from a binding energy obtained by XPS.

The inverted perovskite structure in the dielectric 20 is not limited to a particular structure. The inverted perovskite structure may be a $NH_4Pb_2Br_5$-type structure, a $Cs_3CoCl_5$-type structure, a $La_2CuSbS_5$-type structure, a $La_4FeSb_2S_{10}$-type structure, a $Ba_4In_2Te_2S_5$-type structure, a $Y_2HfS_5$-type structure, or $al_2Cl_5$-type structure.

Figure 6A:
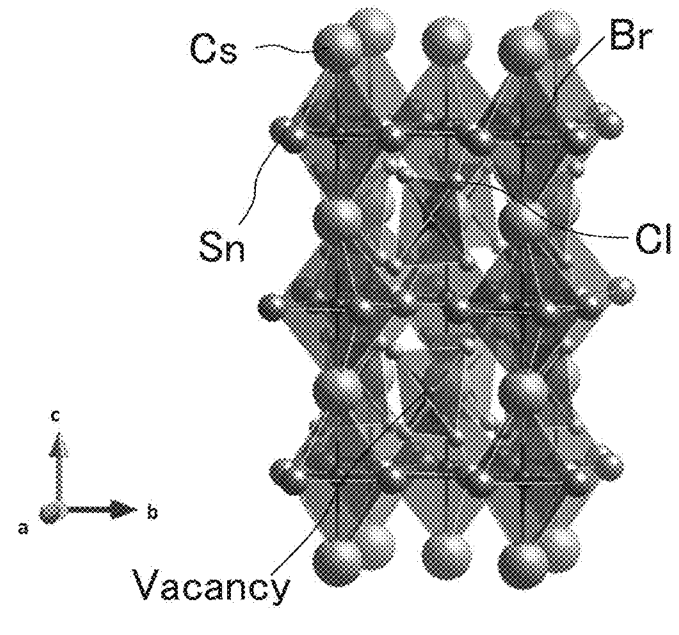
FIG. 6A shows a crystal structure of $CsSn_2Cl_4Br$ as anion-centered coordination polyhedra.
Figure 6B:
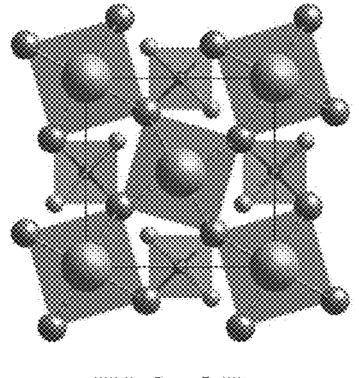
FIG. 6B shows the crystal structure shown in FIG. 6A and viewed along the negative c-axis direction.

For example, $CsSn_2Cl_5$ shown in FIGS. 5A, 5B, and 5C has a $NH_4Pb_2Br_5$-type structure whose space group is 14/mcm. FIG. 6A shows a crystal structure of $CsSn_2Cl_4Br$ as anion-centered coordination polyhedra, and FIG. 6B shows the crystal structure shown in FIG. 6A and viewed along the negative c-axis direction. $CsSn_2Cl_4Br$ also has a $NH_4Pb_2Br_5$-type inverted perovskite structure whose space group is 14/mcm. The composition of the $NH_4Pb_2Br_5$-type structure is represented, for example, by $DE_2Q_5$ or $DE_2Q_4R$. In these compositions, D and E are each a cation, and Q and R are each an anion. In $CsSn_2Cl_5$, as described above, $Cl_4^{4-}$ is present at the A site, $Cl^-$ is present at the B site, and $Cs^+$ or $Sn^{2+}$ is present at the X site. Hence, $CsSn_2Cl_5$ is expressed as $(Cl_4)Cl(CsSn_2)$ in $ABX_3$. $Cs^+$ or $Sn^{2+}$ is present at each vertex of the corner-sharing octahedron, and $Cl^-$ is present at the center of the octahedron.

Figure 7A:
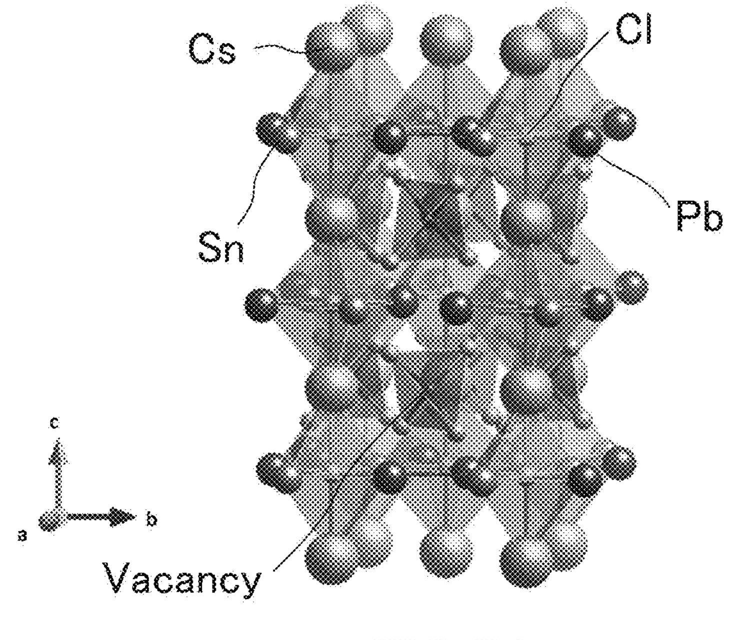
FIG. 7A shows a crystal structure of $CsSnPbCl_5$ as anion-centered coordination polyhedra.
Figure 7B:
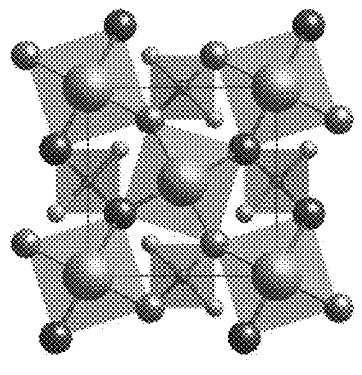
FIG. 7B shows the crystal structure shown in FIG. 7A and viewed along the negative c-axis direction.

The $NH_4Pb_2Br_5$-type structure can have a composition represented by $DEGQ_5$ or $DEGQ_4R$ except the above ones. In these compositions, D, E, and G are each a cation, and Q and R are each an anion. For example, a composition $CsSnPbCl_5$ can be obtained by replacing the ions at the Sn site of $CsSn_2Cl_5$ by two cations, $Sn^{2+}$ and $Pb^{2+}$, as shown in FIG. 7A. FIG. 7B shows the crystal structure shown in FIG. 7A and viewed along the negative c-axis direction. It should be noted that depending on an occupancy rate, the symmetry may be lower than that of the space group 14/mcm.

Figure 8A:
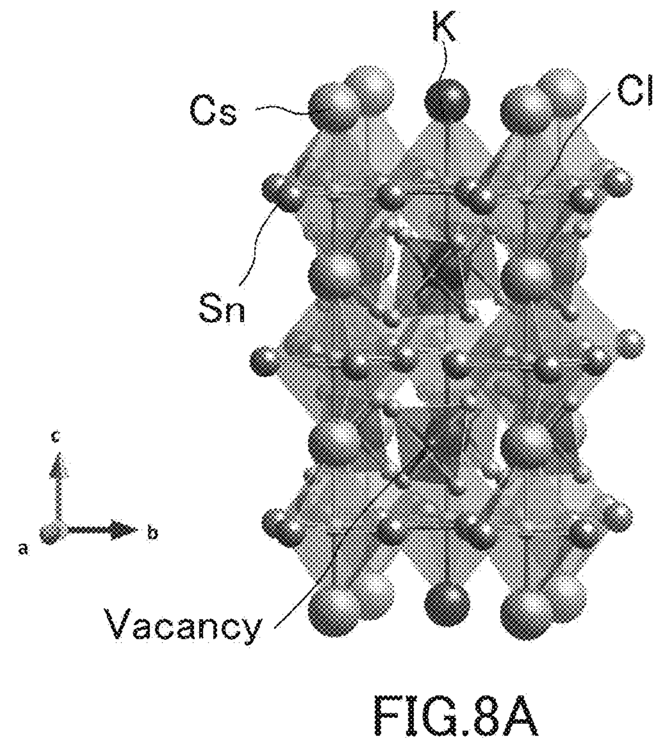
FIG. 8A shows a crystal structure of $KCsSn_4Cl_{10}$ as anion-centered coordination polyhedra.
Figure 8B:
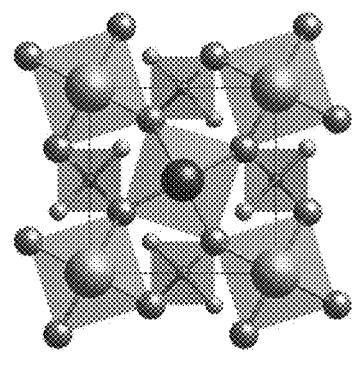
FIG. 8B shows the crystal structure shown in FIG. 8A and viewed along the negative c-axis direction.

The $NH_4Pb_2Br_5$-type structure can have a composition represented by $DEG_4Q_{10}$ or $DEG_4Q_8R_2$ except the above ones. In these compositions, D, E, and G are each a cation, and Q and R are each an anion. For example, a composition $KCsSn_4Cl_{10}$ can be obtained by replacing the ions at the Cs site of $CsSn_2Cl_5$ by two cations, $K^+$ and $Cs^+$, as shown in FIG. 8A. FIG. 8B shows the crystal structure shown in FIG. 8A and viewed along the negative c-axis direction. It should be noted that depending on an occupancy rate, the symmetry may be lower than that of the space group 14/mcm.

Figure 9A:
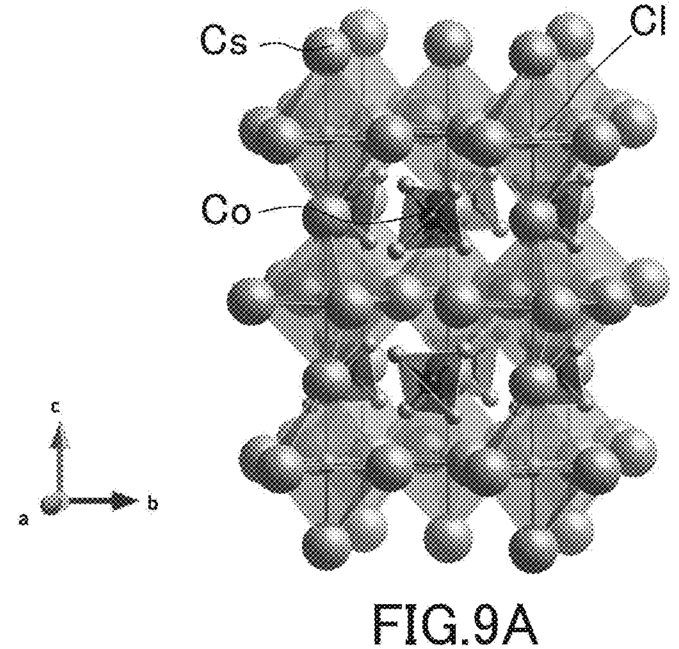
FIG. 9A shows a crystal structure of $Cs_3CoCl_5$ as anion-centered coordination polyhedra.
Figure 9B:
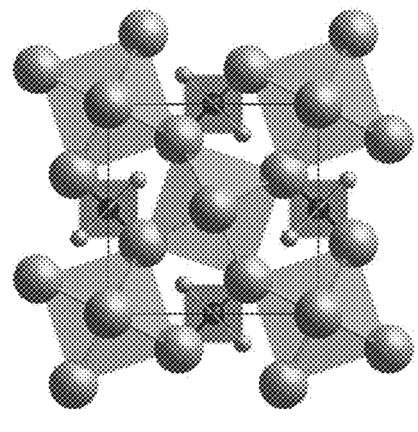
FIG. 9B shows the crystal structure shown in FIG. 9A and viewed along the negative c-axis direction.
Figure 10A:
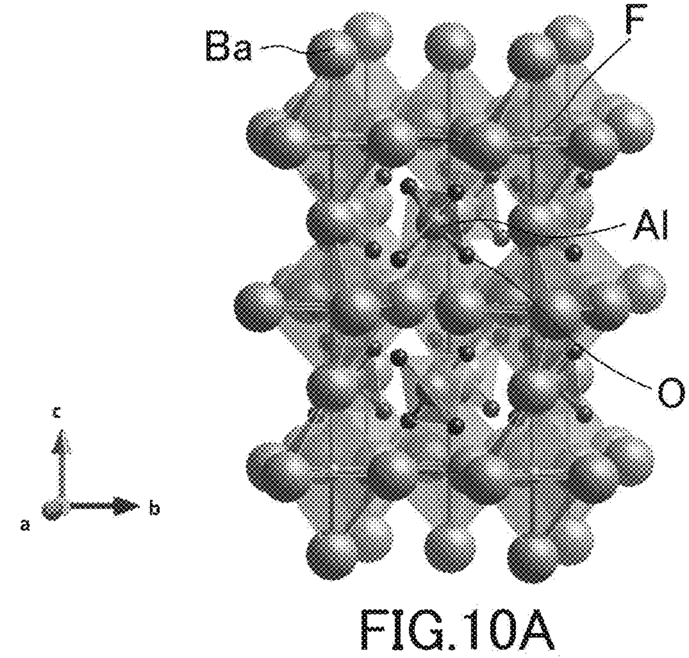
FIG. 10A shows a crystal structure of $BasAlO_4F$ as anion-centered coordination polyhedra.
Figure 10B:
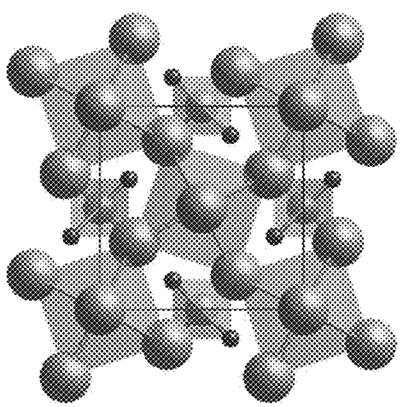
FIG. 10B shows the crystal structure shown in FIG. 10A and viewed along the negative c-axis direction.
Figure 11A:
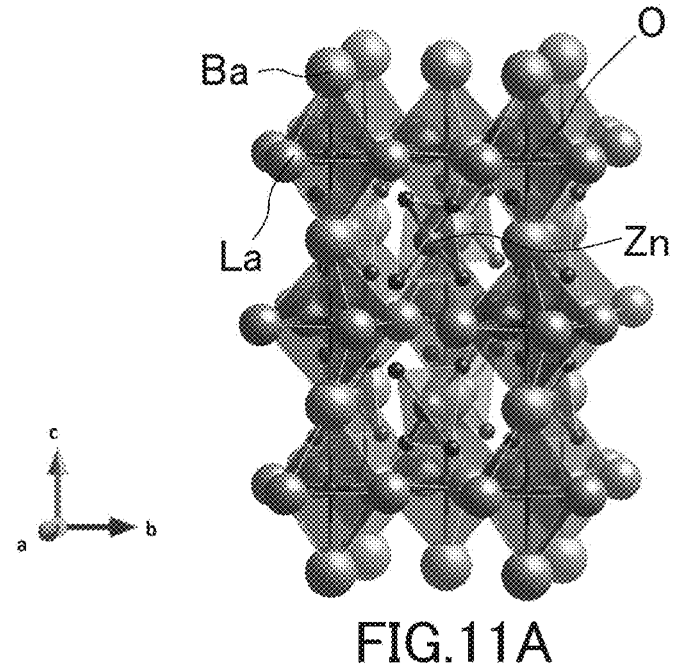
FIG. 11A shows a crystal structure of $BaLa_2ZnO_5$ as anion-centered coordination polyhedra.
Figure 11B:
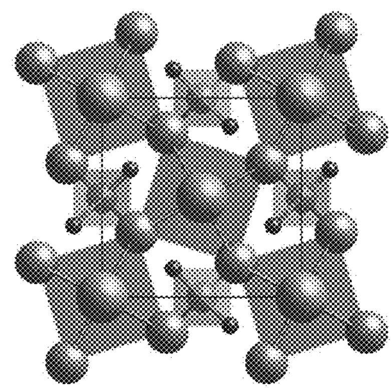
FIG. 11B shows the crystal structure shown in FIG. 11A and viewed along the negative c-axis direction.
Figure 12A:
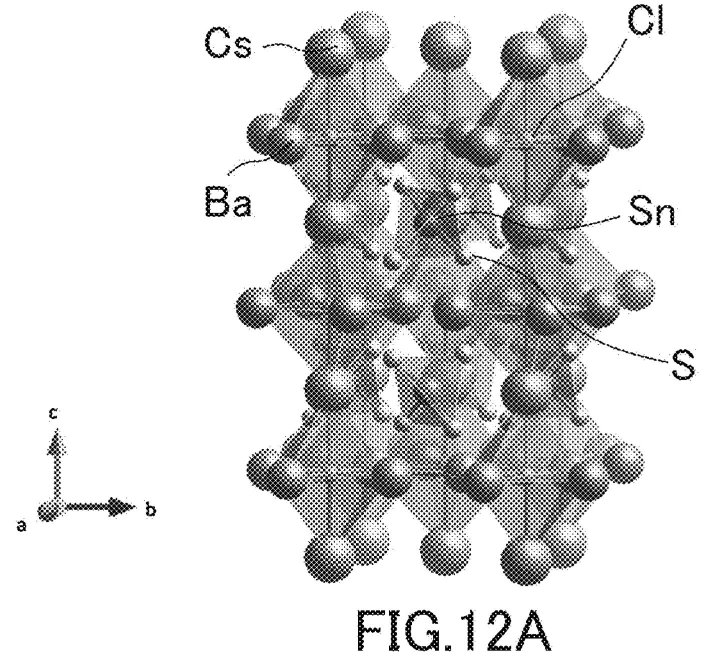
FIG. 12A shows a crystal structure of $CsBa_2SnS_4Cl$ as anion-centered coordination polyhedra.
Figure 12B:
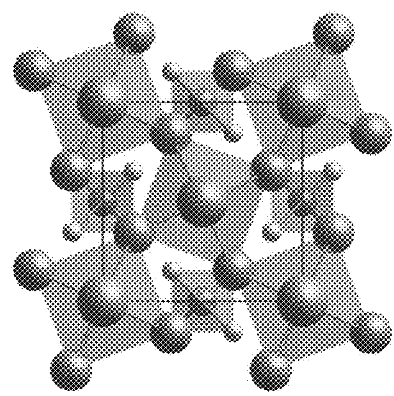
FIG. 12B shows the crystal structure shown in FIG. 12A and viewed along the negative c-axis direction.

FIG. 9A shows a crystal structure of $Cs_3CoCl_5$ by anion-centered coordination polyhedra, and FIG. 9B shows the crystal structure shown in FIG. 9A and viewed along the negative c-axis direction. FIG. 10A shows a crystal structure of $Ba_3AlO_4F$ as anion-centered coordination polyhedra, and FIG. 10B shows the crystal structure shown in FIG. 10A and viewed along the negative c-axis direction. FIG. 11A shows a crystal structure of $BaLa_2ZnO_5$ as anion-centered coordination polyhedra, and FIG. 11B shows the crystal structure shown in FIG. 11A and viewed along the negative c-axis direction. FIG. 12A shows a crystal structure of $CsBa_2SnS_4Cl$ as anion-centered coordination polyhedra, and FIG. 12B shows the crystal structure shown in FIG. 12A and viewed along the negative c-axis direction. These crystal structures are inverted perovskite structures whose space groups are 14/mcm. In these structures, an anion being a polyatomic ion in which an anion such as $Cl^-$ is present at each vertex of a tetrahedron and a cation such as $Co^{2+}$ is present at the center of the tetrahedron occupies the A site. The composition of the $Cs_3CoCl_5$-type structure is represented, for example, by $D_3EQ_5$, $D_3EQ_4R$, $DE_2GQ_5$, $DE_2GQ_4R$, or the like. In these compositions, D, E, and G are each a cation, and Q and R are each an anion. As shown in FIGS. 9A and 9B, for example, in $Cs_3CoCl_5$, $(CoCl_4)^{2-}$ is present at the A site, $Cl^-$ is present at the B site, and $Cs^+$ is present at the X site. Hence, $Cs_3CoCl_5$ is expressed as $(CoCl_4)ClCs_3$ in $ABX_3$. $C^+$ is present at each vertex of a corner-sharing octahedron, and $Cl^-$ is present at the center of the octahedron.

Figure 13A:
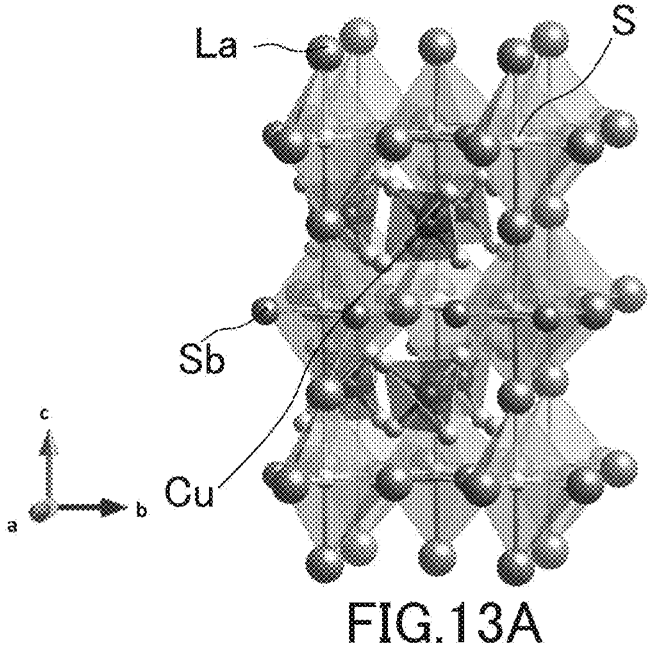
FIG. 13A shows a crystal structure of $La_2CuSbS_5$ as anion-centered coordination polyhedra.
Figure 13B:
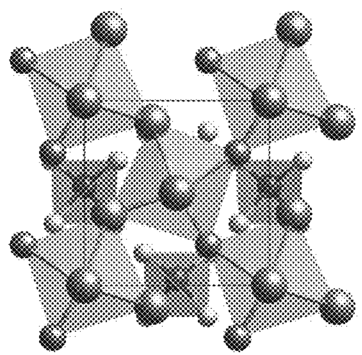
FIG. 13B shows the crystal structure shown in FIG. 13A and viewed along the negative c-axis direction.

FIG. 13A shows a crystal structure of $La_2CuSbS_5$ as anion-centered coordination polyhedra. FIG. 13B shows the crystal structure shown in FIG. 13A and viewed along the negative c-axis direction. This crystal structure is an inverted perovskite structure whose space group is Ima2. In this structure, an anion being a polyatomic ion in which an anion such as $S^{2-}$ is present at each vertex of a tetrahedron and a cation such as $Cu^+$ is present at the center of the tetrahedron occupies the A site. The composition of the $La_2CuSbS_5$-type structure is represented by, for example, $D_3EQ_5$, $D_3EQ_4R$, $DE_2GQ_5$, $DE_2GQ_4R$, or the like. In these compositions, D, E, and G are each a cation, and Q and R are each an anion. As shown in FIGS. 13A and 13B, for example, in $La_2CuSbS_5$, $(CuS_4)^{7-}$ is present at the A site, $S^{2-}$ is present at the B site, and $La^{3+}$ and $Sb^{3+}$ are present at the X site. Hence, $La_2CuSbS_5$ is expressed as $(CuS_4)S\ La_2Sb)$ in $ABX_3$. $La^{3+}$ and $Sb^{3+}$ are present at the vertexes of a corner-sharing octahedron, and $S^2$ is present at the center of the octahedron. The $La_2CuSbS_5$-type structure is basically the same as the $Cs_3CoCl_5$-type structure; replacement of the ions at the Cs site of the $Cs_3CoCl_5$-type structure by $La^{3+}$ and $Sb^{3+}$ distorts the Cl—Co octahedron of the $Cs_3CoCl_5$-type structure to lower the symmetry, changing the $Cs_3CoCl_5$-type structure to the $La_2CuSbS_5$-type structure.

Figure 14A:
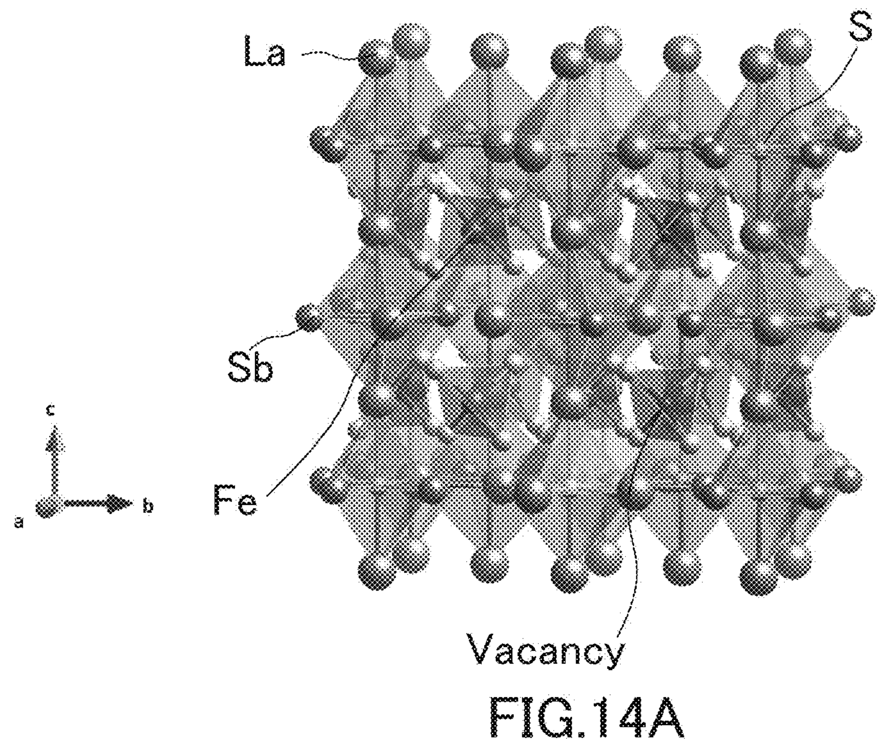
FIG. 14A shows a crystal structure of $La_4FeSb_2S_{10}$ as anion-centered coordination polyhedra.
Figure 14B:
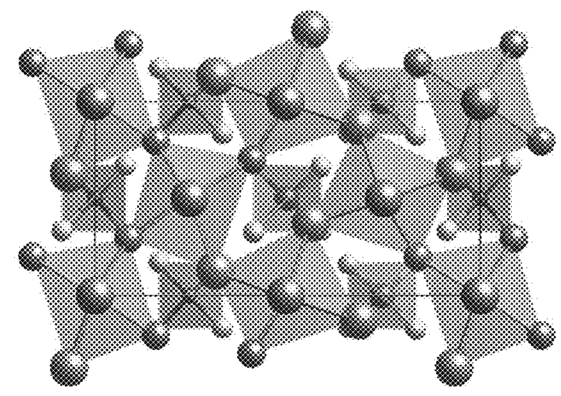
FIG. 14B shows the crystal structure shown in FIG. 14A and viewed along the negative c-axis direction.

FIG. 14A shows a crystal structure of $La_4FeSb_2S_{10}$ as anion-centered coordination polyhedra, and FIG. 14B shows the crystal structure shown in FIG. 14A and viewed along the negative c-axis direction. This crystal structure is an inverted perovskite structure whose space group is Pbcm. In this structure, an anion being a polyatomic ion in which an anion such as $S^{2-}$ is present at each vertex of tetrahedra and a cation such as $Fe^{2+}$ is present at the centers of some of the tetrahedra occupies the A site. The composition of the $La_4FeSb_2S_{10}$-type structure is represented, for example, by $D_6EQ_{10}$, $D_6EQ_8R_2$, $D_2E_4GQ_5$, $D_2E_4GQ_8R_2$, or the like. In these compositions, D, E, and G are each a cation, and Q and R are each an anion. As shown in FIGS. 14A and 14B, for example, in $La_4FeSb_2S_{10}$, $(FeS_4)^{6-}$ is present at the A site, $S^{2-}$ is present at the B site, and $La^{3+}$ and $Sb^{3+}$ are present at the X site. Hence, $La_4FeSb_2S_{10}$ is expressed as $[(FeS_4)(S_4)]S_2(La_2Sb)_2$ in $A_2B_2X_6$. $La^{3+}$ and $Sb^{3+}$ are present at the vertices of corner-sharing octahedra, and $S^{2+}$ is present at the center of each of the octahedra. The $La_4FeSb_2S_{10}$-type structure is basically the same as the $Cs_3CoCl_5$-type structure; losing an ion at one or some of the Co sites each at the center of a Co—Cl tetrahedron of the $Cs_5CoCl_5$-type structure lowers the symmetry, changing the $Cs_3CoCl_5$-type structure to the $La_4FeSb_2S_{10}$-type structure.

Figure 15A:
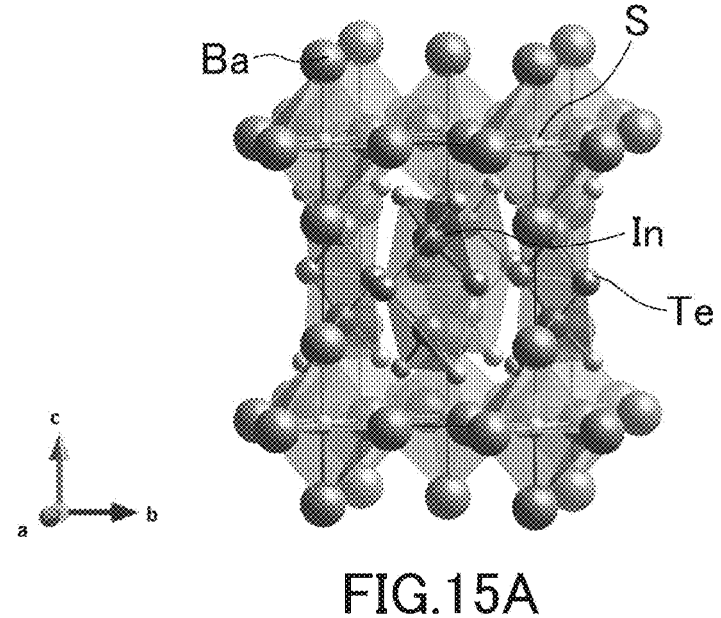
FIG. 15A shows a crystal structure of $Ba_4In_2Te_2S_5$ as anion-centered coordination polyhedra.
Figure 15B:
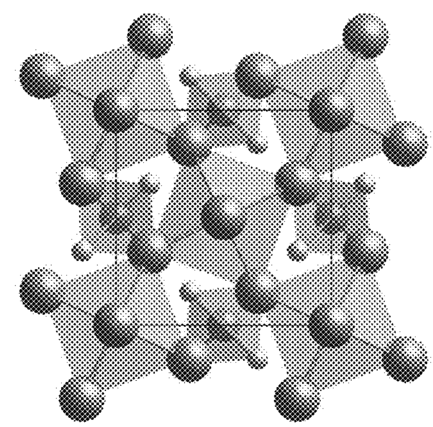
FIG. 15B shows the crystal structure shown in FIG. 15A and viewed along the negative c-axis direction.

FIG. 15A shows a crystal structure of $Ba_4In_2Te_2S_5$ as anion-centered coordination polyhedra, and FIG. 15B shows the crystal structure shown in FIG. 15A and viewed along the negative c-axis direction. $Ba_4In_2Te_2S_5$ has a layered inverted perovskite structure. The composition of $Ba_4In_2Te_2S_5$-type structure is represented, for example, by $D_2E_4Q_7$, $D_2E_4Q_5R_2$, $DE_3G_2Q_7$, $DE_3G_2Q_5R_2$, or the like. In these compositions, D, E, and G are each a cation, and Q and R are each an anion. As shown in FIGS. 15A and 15B, in $Ba_4In_2Te_2S_5$, $(InS_2Te)_2^{6-}$ is present at the A site, $S^{2-}$ is present at the B site, and $Ba^{2+}$ is present at the X site in a layered perovskite structure $A_2BX_4$. Hence, $Ba_4In_2Te_2S_5$ is expressed as $(InS_2Te)_2SBa_4$ in $A_2BX_4$. $Ba^{2+}$ is present at each vertex of a corner-sharing octahedron, and $S^{2-}$ is present at the center of the octahedron.

Figure 16A:
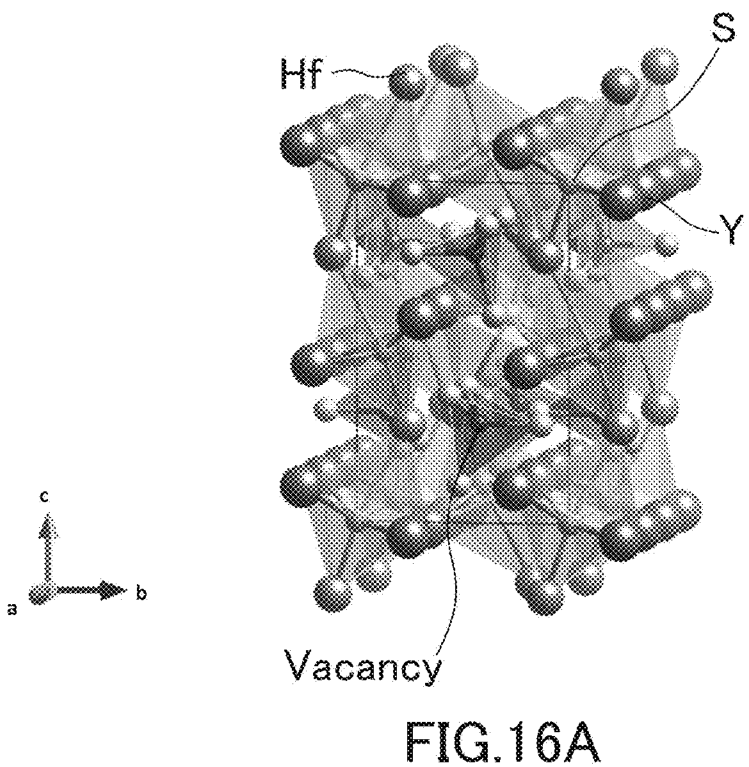
FIG. 16A shows a crystal structure of $Y_2HfS_5$ as anion-centered coordination polyhedra.
Figure 16B:
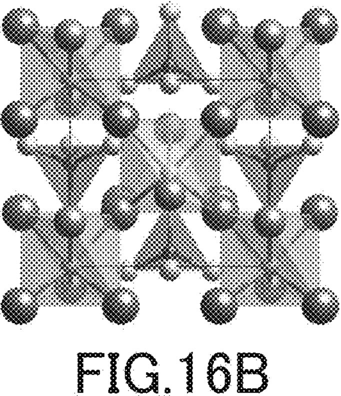
FIG. 16B shows the crystal structure shown in FIG. 16A and viewed along the negative c-axis direction.

FIG. 16A shows a crystal structure of $Y_2HfS_5$ as anion-centered coordination polyhedra, and FIG. 16B shows the crystal structure shown in FIG. 16A and viewed along the negative c-axis direction. $Y_2HfS_5$ has an inverted perovskite structure whose space group is Pnma. The composition of the $Y_2HfS_5$-type structure is represented, for example, by $DE_2Q_5$ or $DE_2Q_4R$. In these compositions, D and E are each a cation, and Q and R are each an anion. In $Y_2HfS_5$, as described above, $S_4^{8-}$ is present at the A site, $S^{2-}$ is present at the B site, and $Y^{3+}$ or $Hf^{4+}$ is present at the X site. Hence, $Y_2HfS_5$ is expressed as $(S_4)S(Y_2Hf)$ in $ABX_3$. $Y^{3+}$ or $Hf^{4+}$ is present at each vertex of a corner-sharing octahedron, and $S^{2-}$ is present at the center of the octahedron. The $NH_4Pb_2Br_5$-type structure is based on a tetragonal perovskite structure ($SrZrO_3$). On the other hand, the $Y_2HfS_5$-type structure is based on an orthorhombic perovskite structure ($GdFeO_3$). A tetragonal perovskite structure is a structure in which octahedra are linearly linked in the c-axis direction, while an orthorhombic perovskite structure is a structure in which octahedra are linked in a zig-zag manner in the c axis direction. Since a tetragonal perovskite structure in which octahedra are linearly linked in the c-axis direction has a higher relative permittivity, the $NH_4Pb_2Br_5$-type structure is more advantageous than the $Y_2HfS_5$-type structure from the viewpoint of a dielectric.

Figure 17A:
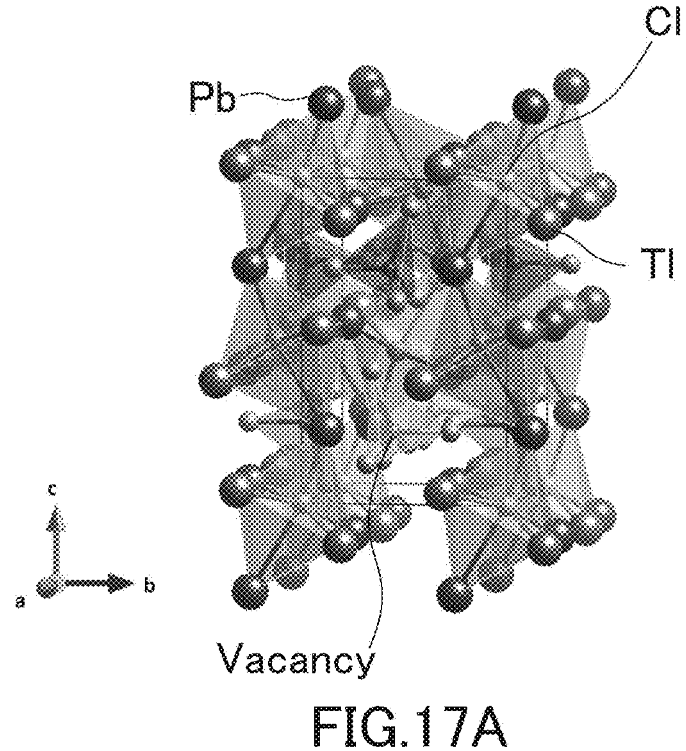
FIG. 17A shows a crystal structure of $TlPb_2Cl_5$ as anion-centered coordination polyhedra.
Figure 17B:
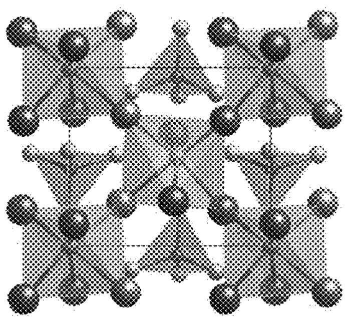
FIG. 17B shows the crystal structure shown in FIG. 17A and viewed along the negative c-axis direction.

FIG. 17A shows a crystal structure of $TlPb_2Cl_5$ as anion-centered coordination polyhedra, and FIG. 17B shows the crystal structure shown in FIG. 17A and viewed along the negative c-axis direction. $TlPb_2Cl_5$ has an inverted perovskite structure whose space group is P121/C1. The composition of the $TlPb_2Cl_5$-type structure is represented, for example, by a composition represented by $DE_2Q_5$ or $DE_2Q_4R$. In these compositions, D and E are each a cation, and Q and R are each an anion. In $TlPb_2Cl_5$, as described above, $Cl_4^{4-}$ is present at the A site, $Cl^-$ is present at the B site, and $Tl^+$ or $Pb^{2+}$ is present at the X site. Hence, $TlPb_2Cl_5$ is expressed as $(Cl_4)Cl(TlPb_2)$ in $ABX_3$. $Tl^+$ or $Pb^{2+}$ is present at each vertex of a corner-sharing octahedron, and $Cl^-$ is present at the center of the octahedron. The $TlPb_2Cl_5$-type structure is based on an orthorhombic perovskite structure ($GdFeO_3$), as is the $Y_2HfS_5$-type structure. While the $Y_2HfS_5$-type structure includes octahedra having Y and Hf cations alternately arranged along the c axis, the $TlPb_2Cl_5$-type structure does not. Since a tetragonal perovskite structure in which octahedra are linearly linked in the c-axis direction has a higher relative permittivity, the $NH_4Pb_2Br^5$-type structure is more advantageous than the $Y_2HfS_5$-type structure from the viewpoint of a dielectric.

Examples of a perovskite structure in which an anion is present at each vertex of corner-sharing octahedra and a cation is present at the center of each of the octahedra include a one-dimensional perovskite structure, a zero-dimensional perovskite structure, a double perovskite structure, a quadruple perovskite structure, an A-site deficient perovskite structure, a B-site deficient perovskite structure, a Ruddlesden-Popper structure, and a Dion-Jacobson structure. The one-dimensional perovskite structure is represented by $A_3BX_5$, and the zero-dimensional perovskite structure is represented by $A_4BX_6$. The double perovskite structure is represented by $A_2BB'X_6$, and a quadruple perovskite structure is represented by $AA'_3B_4X_{12}$. The A-site deficient perovskite structure is represented by $A_{(2-\alpha)}B_2X_6$, and the B-site deficient perovskite structure is represented by $A_2B_{(2-\beta)}X_6$. The Ruddlesden-Popper structure is represented by $A_{x+1}B_xX_{3x+1}$. The Dion-Jacobson structure is represented by $A'[A_{y-1}B_yX_{3y+1}]$. For each of these structures, there can be an inverted perovskite structure in which a site occupied by an anion and a site occupied by a cation are switched. The inverted perovskite structure in the dielectric 20 may be such an inverted perovskite structure.

The relative permittivity of the dielectric 20 is not limited to a particular value. The relative permittivity of the dielectric 20 at a room temperature may be, for example, more than 40, 45 or more, 50 or more, 60 or more, 80 or more, or 100 or more at 1 MHz. The room temperature is a particular temperature in the range of, for example, 20° C. to 25° C. The relative permittivity of the dielectric 20 at the room temperature is, for example, 10000 or less at 1 MHZ. In other words, the relative permittivity of the dielectric 20 at the room temperature is, for example, 40 or more and 10000 or less at 1 MHz.

As shown in FIG. 3, the dielectric 20 of the capacitor 1*a* is formed, for example, as a film. A method for disposing the dielectric 20 in the capacitor 1*a* is not limited to a particular method. The dielectric 20 may be formed, for example, by spin coating, inkjet coating, die coating, roll coating, bar coating, Langmuir-Blodgett, dip coating, or spray coating. This makes it more likely that the dielectric 20 has a high relative permittivity and the capacitor 1*a* has a high capacitance. The dielectric 20 may be formed by sputtering, anodic oxidation, vacuum deposition, pulsed laser deposition (PLD), atomic layer deposition (ALD), or chemical vapor deposition (CVD).

As shown in FIG. 3, the dielectric 20 is disposed, for example, between the first electrode 11 and the second electrode 12 in a thickness direction of the dielectric 20. The second electrode 12 covers, for example, at least a portion of the dielectric 20.

Materials of the first electrode 11 and the second electrode 12 are not limited to particular materials. The first electrode 11 and the second electrode 12 each include, for example, a metal. The first electrode 11 includes, for example, a valve metal. Examples of the valve metal include Al, Ta, Nb, and Bi. The first electrode 11 includes, for example, at least one selected from the group consisting of Ta, Nb, and Bi as the valve metal. The first electrode 11 may include a noble metal such as gold or platinum, nickel, or a metal element in Group 13, Group 14, or Group 15.

The second electrode 12 may include, for example, a valve metal such as Al, Ta, Nb, or Bi, a noble metal such as gold, silver, or platinum, nickel, or a metal element in Group 13, Group 14, or Group 15. The second electrode 12 includes, for example, at least one selected from the group consisting of Al, Ta, Nb, Bi, gold, silver, platinum, and nickel.

As shown in FIG. 3, the first electrode 11 has a principal surface 11*p*. One principal surface of the dielectric 20 is in contact with, for example, the principal surface 11*p*. The second electrode 12 has a principal surface 12*p* parallel to the principal surface 11*p*. The other principal surface of the dielectric 20 is in contact with, for example, the principal surface 12*p*.

Figure 18A:
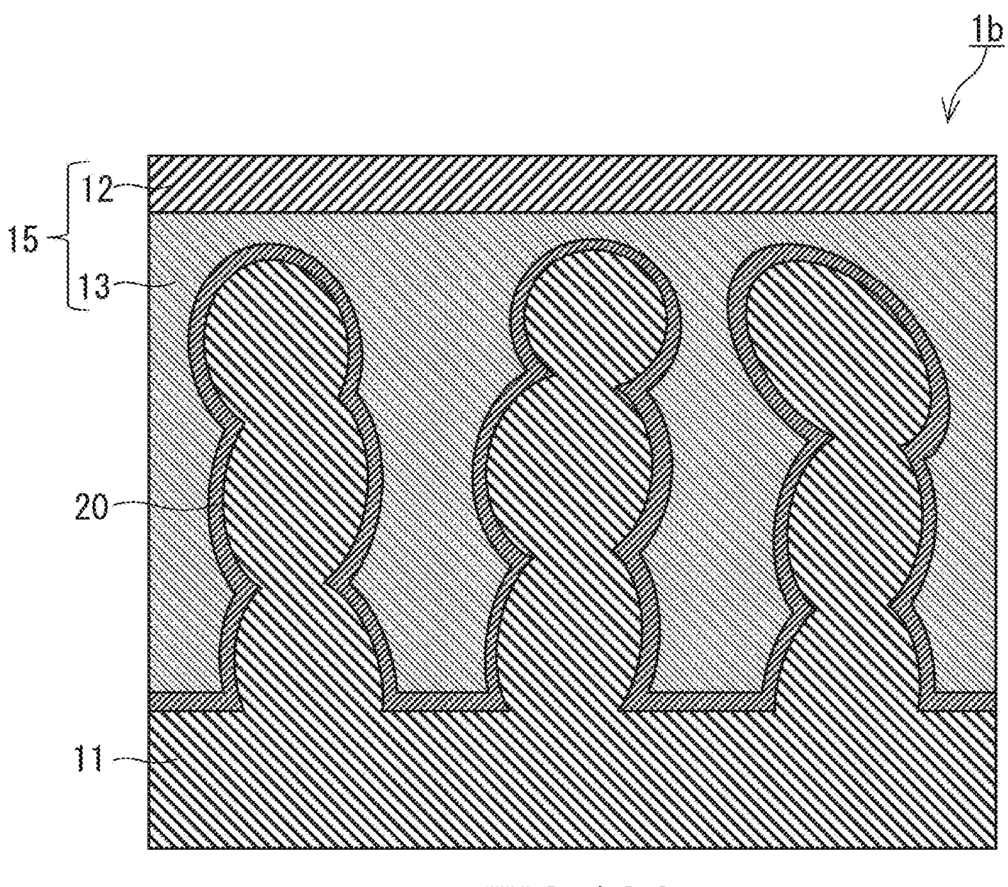
FIG. 18A is a cross-sectional view showing another example of the capacitor of the present disclosure.

FIG. 18A is a cross-sectional view showing another example of the capacitor of the present disclosure. A capacitor 1*b* shown in FIG. 18A is configured in the same manner as the capacitor 1*a* unless otherwise described. The components of the capacitor 1*b* that are the same as or correspond to the components of the capacitor 1*a* are denoted by the same reference characters, and detailed descriptions of such components are omitted. The description given for the capacitor 1*a* is applicable to the capacitor 1*b* unless there is a technical inconsistency. The same is applicable to capacitors 1*c* and 1*d* described later.

The capacitor 1*b* shown in FIG. 18A is an electrolytic capacitor. As shown in FIG. 18A, at least a portion of the first electrode 11 is porous in the capacitor 1*b*. This makes it likely that the first electrode 11 has a large surface area and the capacitor 1*b* has a higher capacitance. The porous structure as described above can be formed, for example, by a method such as etching of a metallic foil or sintering of a powder.

As shown in FIG. 18A, for example, the film of the dielectric 20 is placed on a surface of the porous portion of the first electrode 11. For example, spin coating, inkjet coating, die coating, roll coating, bar coating, Langmuir-Blodgett, dip coating, or spray coating can be adopted as the method for forming the dielectric 20. The dielectric 20 may be formed, for example, by sputtering, anodic oxidation, vacuum deposition, PLD, ALD, or CVD.

The first electrode 11 includes, for example, a valve metal such as Al, Ta, Nb, Zr, Hf, or Bi. The second electrode 12 may include, for example, a solidified body of a silver-including paste, a carbon material such as graphite, or both the solidified body and the carbon material. In the capacitor 1*b*, an electrolyte 13 is disposed, for example, between the first electrode 11 and the second electrode 12. Specifically, the electrolyte 13 is disposed between the dielectric 20 and the second electrode 12. In the capacitor 1*b*, for example, a cathode is formed of the second electrode 12 and the electrolyte 13. In the capacitor 1*b*, the electrolyte 13 is disposed, for example, to fill a space around the porous portion of the first electrode 11.

The electrolyte 13 includes, for example, at least one selected from the group consisting of an electrolyte solution and an electrically conductive polymer. Examples of the electrically conductive polymer include polypyrrole, a polythiophene, polyaniline, and derivatives of these. The electrolyte 13 may be made of a manganese compound such as manganese oxide. The electrolyte 13 may include a solid electrolyte.

The electrolyte 13 including the electrically conductive polymer can be formed by performing chemical polymerization, electrolytic polymerization, or both chemical polymerization and electrolytic polymerization of a raw material monomer on the dielectric 20. The electrolyte 13 including the electrically conductive polymer may be formed by making a solution or a dispersion of the electrically conductive polymer adhere to the dielectric 20.

Figure 18B:
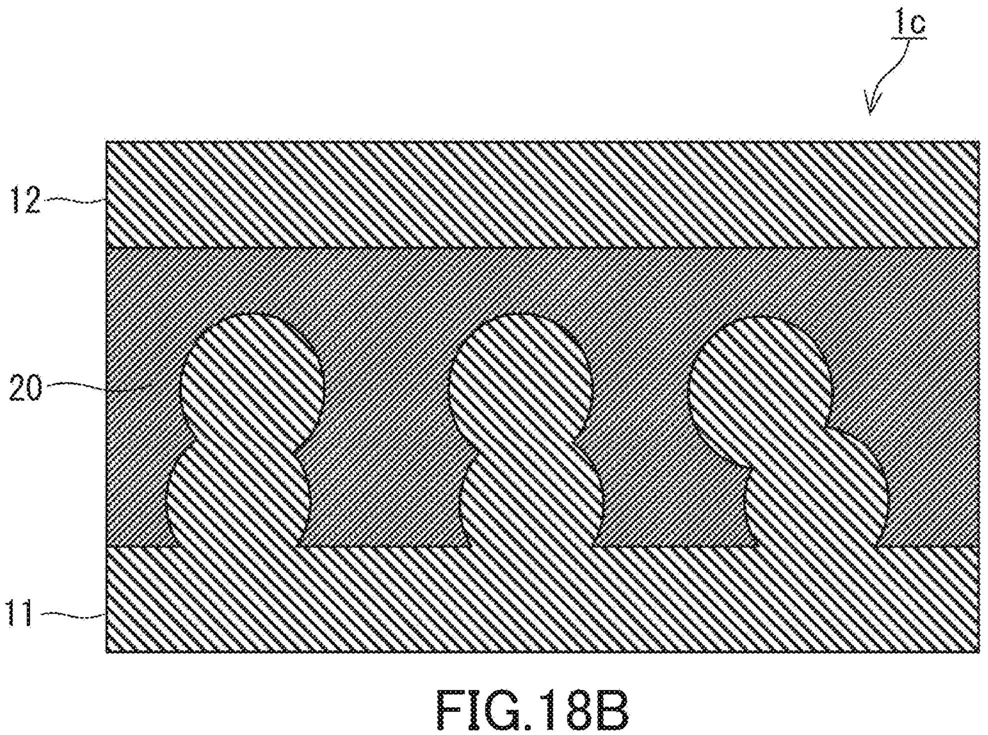
FIG. 18B is a cross-sectional view showing yet another example of the capacitor of the present disclosure.

FIG. 18B is a cross-sectional view showing yet another example of the capacitor of the present disclosure. At least a portion of the first electrode 11 is porous in the capacitor 1*c* shown in FIG. 18B. This makes it likely that the first electrode 11 has a large surface area and the capacitor 1*c* has a higher capacitance. The porous structure as described above can be formed, for example, by a method such as etching of a metallic foil or sintering of a powder.

As shown in FIG. 18B, for example, the film of the dielectric 20 is placed on the porous portion of the first electrode 11. For example, spin coating, an inkjet technique, die coating, roll coating, bar coating, Langmuir-Blodgett, dip coating, or spray coating can be adopted as the method for forming the dielectric 20. In the capacitor 1*c*, the dielectric 20 is disposed, for example, to fill a space around the porous portion of the first electrode 11.

Figure 18C:
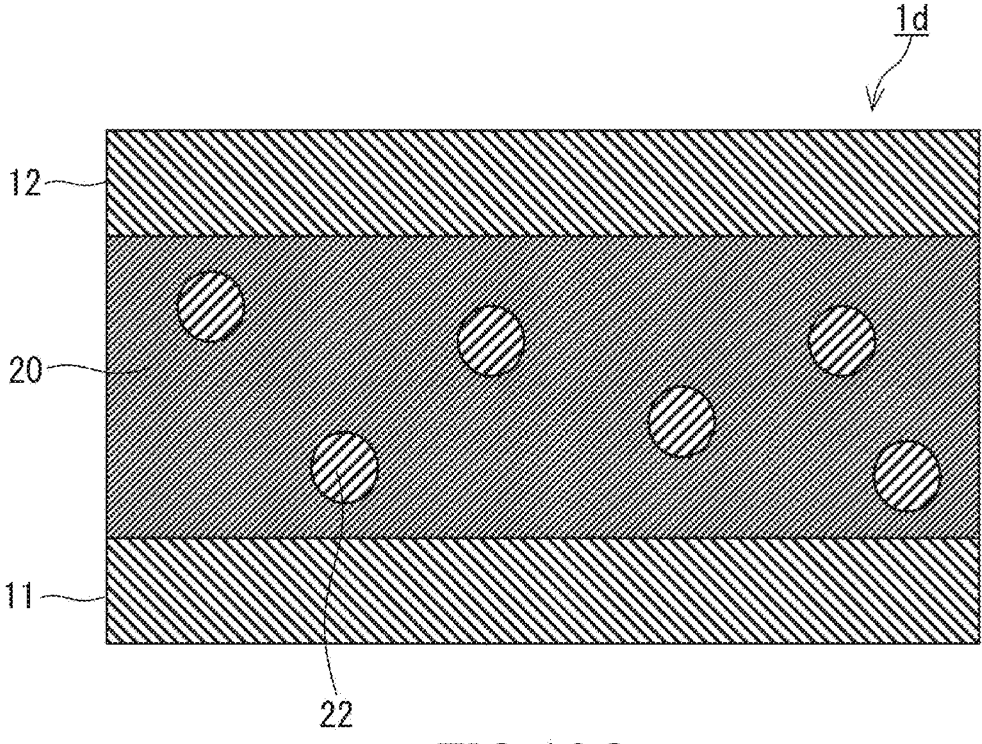
FIG. 18C is a cross-sectional view showing yet another example of the capacitor of the present disclosure.

FIG. 18C is a cross-sectional view showing yet another example of the capacitor of the present disclosure. The dielectric 20 of the capacitor 1*d* shown in FIG. 18C is formed, for example, as a film. Particles of a dissimilar dielectric 22 different from the dielectric 20 are dispersed in this film. For example, spin coating, an inkjet technique, die coating, roll coating, bar coating, Langmuir-Blodgett, dip coating, or spray coating can be adopted as the method for forming this film. For example, the film including the dielectric 20 and the dissimilar dielectric 22 can be obtained by forming a coating film of a liquid precursor containing a raw material of the dielectric 20 and the particles of the dissimilar dielectric 22 by the above method. This film may be formed by sputtering, anodic oxidation, vacuum deposition, PLD, ALD, or CVD.

The dissimilar dielectric 22 is not limited to a particular dielectric as long as the dissimilar dielectric 22 is a different type of dielectric from the dielectric 20. The dissimilar dielectric 22 has a relative permittivity, for example, higher than that of the dielectric 20. For example, the dissimilar dielectric 22 may be made of a perovskite compound such as $BaTiO_3$, $PbTiO_3$, or $SrTiO_3$, or may be made of a layered perovskite compound. The dissimilar dielectric 22 may include at least one selected from the group consisting of a Ruddlesden-Popper compound, a Dion-Jacobson compound, a tungsten bronze compound, and a pyrochlore compound.

The size of the particle of the dissimilar dielectric 22 is not limited to a particular value. The size of the particle of the dissimilar dielectric 22 is, for example, 1 nm or more and 100 nm or less.

Figure 19A:
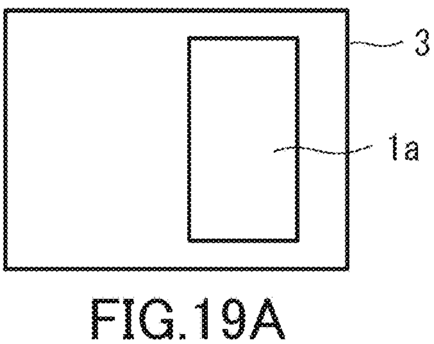
FIG. 19A schematically shows an example of an electrical circuit of the present disclosure.

FIG. 19A schematically shows an example of an electrical circuit of the present disclosure. An electrical circuit 3 includes the capacitor 1*a*. The electrical circuit 3 may be an active circuit or a passive circuit. The electrical circuit 3 may be a discharging circuit, a smoothing circuit, a decoupling circuit, or a coupling circuit. Since including the capacitor 1*a*, the electrical circuit 3 is likely to exhibit a desired performance. For example, it is likely that the capacitor 1*a* reduces noise in the electrical circuit 3. The electrical circuit 3 may include the capacitor 1*b*, 1*c*, or 1*d* instead of the capacitor 1*a*.

Figure 19B:
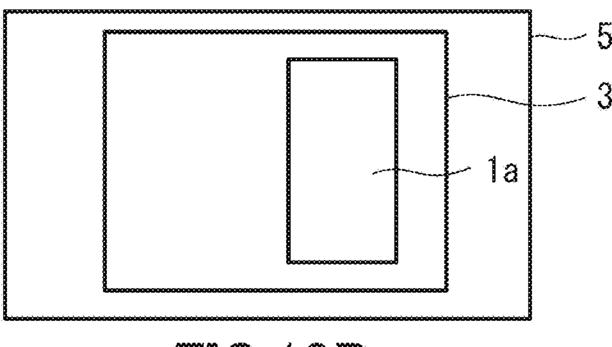
FIG. 19B schematically shows an example of a circuit board of the present disclosure.

FIG. 19B schematically shows an example of a circuit board of the present disclosure. As shown in FIG. 19B, a circuit board 5 includes the capacitor 1*a*. For example, the circuit board 5 includes the electrical circuit 3 including the capacitor 1*a*. The circuit board 5 may be an embedded board or a motherboard. The circuit board 5 may include the capacitor 1*b*, 1*c*, or 1*d* instead of the capacitor 1*a*.

Figure 19C:
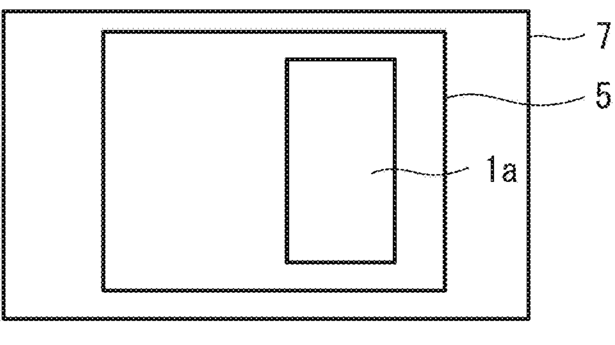
FIG. 19C schematically shows an example of an apparatus of the present disclosure.

FIG. 19C schematically shows an example of an apparatus of the present disclosure. As shown in FIG. 19C, an apparatus 7 includes, for example, the capacitor 1*a*. The apparatus 7 includes, for example, the circuit board 5 including the capacitor 1*a*. Since including the capacitor 1*a*, the apparatus 7 is likely to exhibit a desired performance. The apparatus 7 may be an electronic device, a communication device, a signal-processing device, or a power-supply device. The apparatus 7 may be a server, an AC adapter, an accelerator, or a flat-panel display such as a liquid crystal display (LCD). The apparatus 7 may be a USB charger, a solid-state drive (SSD), an information terminal such as a PC, a smartphone, or a tablet PC, or an Ethernet switch.

EXAMPLES

Hereinafter, the present disclosure will be described in more detail with reference to examples. The examples given below are just examples, and the present disclosure is not limited to them.

Example 1

(Production of Dielectric Material)

A raw material powder including KCl and $SnCl_2$ was prepared in an argon atmosphere (hereinafter referred to as "dry argon atmosphere") with a dew point of −60° C. such that a ratio of the amount of substance of KCl to the amount of substance of $SnCl_2$ was 1:2. This raw material powder was pulverized and mixed together in a mortar. A mixed powder was thus obtained. The mixed powder was milled using a planetary ball mill at 500 revolutions per minute (rpm) for 12 hours. A powdery dielectric according to Example 1 was obtained in this manner. The dielectric according to Example 1 included a halide having a composition represented by $KSn_2Cl_5$.

The dielectric according to Example 1 was measured by X-ray photoelectron spectroscopy (XPS) using an XPS apparatus PHI VersaProbe 2 manufactured by ULVAC PHI, INC. Amounts of K, Sn, and Cl in the dielectric per unit weight were determined from the measurement result. The amounts of K, Sn, and Cl revealed that a relation between the amount of substance of K to the amount of substance of Sn to the amount of substance of Cl was 1:2:5 in the dielectric according to Example 1, as in the raw material powder.

(Evaluation of Relative Permittivity)

Figure 20:
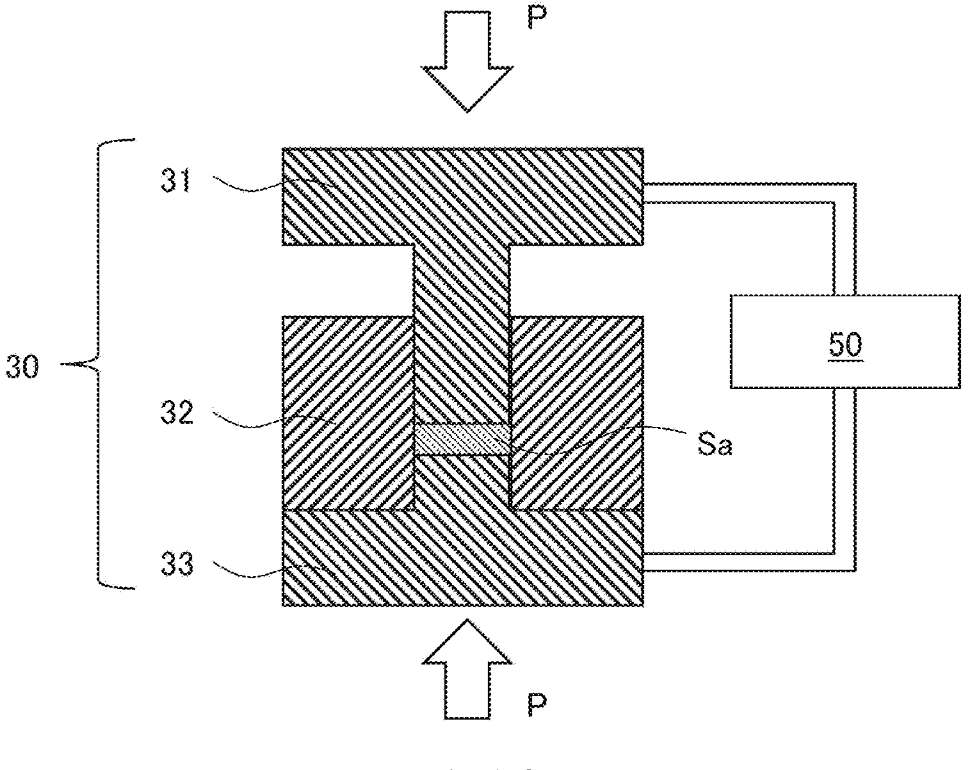
FIG. 20 schematically shows a method for evaluating relative permittivities of dielectrics according to Examples and Comparative Examples.

FIG. 20 schematically shows a relative permittivity evaluation method. As shown in FIG. 20, a compression molding die 30 included an upper punch 31, a die 32, and a lower punch 33. The upper punch 31 and the lower punch 33 were each made of stainless steel, which has electron conductivity. The die 32 was made of polycarbonate, which has electrical insulating properties.

A relative permittivity of the dielectric according to Example 1 was measured by the following method using the compression molding die 30.

The compression molding die 30 was filled with the powdery dielectric according to Example 1 in a dry atmosphere with a dew point of −30° C. or lower to give a sample Sa. In the compression molding die 30, a pressure P of 300 MPa was applied to the sample Sa using the upper punch 31 and the lower punch 33.

While the pressure P was being applied to the sample Sa, the upper punch 31 and the lower punch 33 were connected to a potentiostat 50 equipped with a frequency response analyzer. VersaSTAT4 manufactured by Princeton Applied Research was used as the potentiostat 50. The upper punch 31 was connected to a working electrode and a potential measuring terminal of the potentiostat 50. The lower punch 33 was connected to a counter electrode and a reference electrode of the potentiostat 50. An impedance of the sample Sa was measured at room temperature (25° C.) by an electrochemical impedance measurement method. A relative permittivity $\varepsilon'_r$ of the halide included in the dielectric according to Example 1 at 1 MHz was measured in this manner. A capacitance of the sample was measured, and the measurement value of the capacitance, a thickness of the sample Sa, and an electrode area were used to determine the relative permittivity $\varepsilon'_r$. The relative permittivity $\varepsilon'_r$ measured was corrected using a fill rate f of the pellet (the sample Sa compacted by the pressure P) by the following formula to determine a relative permittivity $\varepsilon_r$. In the following formula, $\varepsilon_{Air}$ is a relative permittivity of air, and was defined as 1 for this calculation.

$$\log\varepsilon_r = (\log\varepsilon'_r - (1-f)*\log\varepsilon_{Air})/f$$

The fill rate f was calculated by the following formula. The symbol $\rho_{pellet}$ is a density of the pellet, and p is a density determined from a crystal structure. Table 1 shows the result. As shown in Table 1, the relative permittivity $\varepsilon_r$ of the halide included in the dielectric according to Example 1 at 25° C. is 119.

$$f = \pi_{pellet}/\rho$$

(Evaluation of Possibility of Synthesis by Calculation)

A calculation model of a $(NH_4)$ $Pb_2Br_5$-type compound having an inverted perovskite structure and having a composition represented by $KSn_2Cl_5$ was generated. A convex hull energy was calculated by first-principles calculation to evaluate a possibility of synthesis of the compound. Structural relaxation was performed by the first-principles calculation, all energy was calculated, and the convex hull energy was calculated. A convex hull energy is a measure of the stability of a target phase relative to another phase. The convex hull energy of the dielectric according to Example 1 having the composition $KSn_2Cl_5$ was calculated by the following formula (1) because KCl and $SnCl_2$ can coexist thermodynamically in the case of the dielectric according to Example 1 having the composition $KSn_2Cl_5$. Table 1 shows the result. In the formula (1), $E_{hull}(A)$ is the convex hull energy of A, and Etot(A) is all energy of A. If $E_{hull}(A)$ is negative, the value determined by the formula (1) is zero.

$$E_{hull}(KSn_2Cl_5) = Etot(KSn_2Cl_5) - Etot(KCl) - 2Etot(SnCl_2) \quad \text{Formula (1)}$$

(Evaluation of Relative Permittivity by Calculation)

Structural relaxation was performed again using a PBEsol functional for the calculation model generated in the above evaluation of the possibility of synthesis, and the relative permittivity was evaluated by density functional perturbation theory calculation. Ion contribution and electron contribution were added, and diagonal elements were averaged to determine the relative permittivity. It should be noted that a compound whose imaginary phonon at point G was greater than 5 meV and a compound whose band gap was zero were omitted from the viewpoint of calculation accuracy. Table 1 shows the result. The vasp cord was used for the first-principles calculation.

(Evaluation of Polarization)

A calculation value of a polarization P of the dielectric according to Example 1 was calculated by the following formula (2) on the basis of the relative permittivity $\varepsilon_r$ determined by the evaluation of the relative permittivity using the above sample Sa. Table 1 shows the result. In the formula (2), co is a permittivity in vacuum, and E is a breakdown electric field. The breakdown electric field E was calculated by the following formula (3) with reference to Wang, Li—Mo. "Relationship between intrinsic breakdown field and bandgap of materials." 2006 25th International Conference on Microelectronics. IEEE, 2006. In the formula (3), $E_g$ is a band gap, and is assumed to be 4 eV for this calculation. The units of E and $E_g$ in the formulae (2) and (3) are respectively V/cm and eV.

$$P = \varepsilon_0(\varepsilon_r - 1)E \quad \text{Formula (2)}$$

$$E = 1.36\times10^7\times(E_g/4) \quad \text{Formula (3)}$$

(Crystal Structure Analysis)

Figure 21:
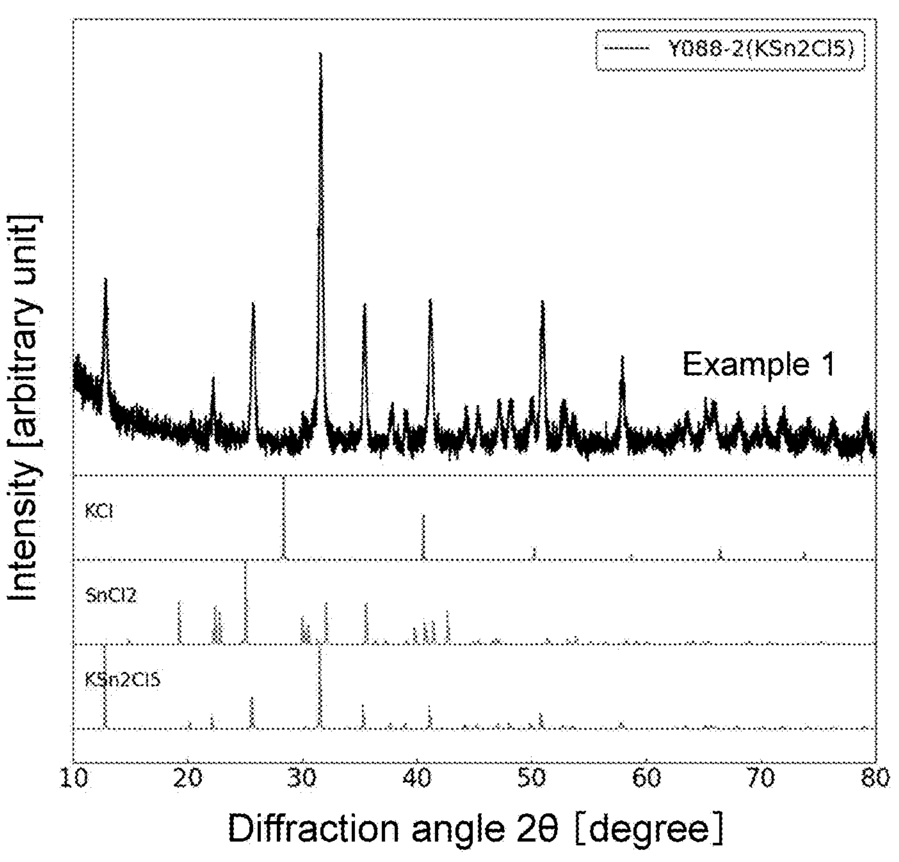
FIG. 21 is a graph showing an X-ray diffraction (XRD) pattern of a dielectric according to Example 1.

X-ray diffraction (XRD) measurement was performed to identify the crystal structure of the dielectric according to Example 1. This measurement was performed under a dry argon atmosphere using a Cu-Kα ray as an X-ray. FIG. 21 is a graph showing an XRD pattern of the dielectric according to Example 1. The horizontal axis indicates a diffraction angle 2θ, and the vertical axis indicates an intensity of X-ray diffraction. FIG. 21 also shows calculation results for XRD patterns of KCl, $SnCl_2$, and $KSn_2Cl_5$ which is of a $(NH_4)$ $Pb_2Br_5$ type. Note that the vertical axis in FIG. 21 shows a relative relation of a diffraction intensity in each XRD pattern, and does not show a relative relation of diffraction intensities between the different XRD patterns. The XRD pattern of the dielectric according to Example 1 confirms that the dielectric according to Example 1 has a $(NH_4)$ $Pb_2Br_5$-type inverted perovskite structure.

Example 2

A powdery dielectric according to Example 2 was produced in the same manner as in Example 1, except that a raw material powder including KBr and $SnCl_2$ was prepared such that a ratio of the amount of substance of KBr to the amount of substance of $SnCl_2$ was 1:2. The composition of the dielectric according to Example 2 was determined by the XPS measurement in the same manner as in Example 1. Moreover, the relative permittivity was evaluated for the dielectric according to Example 2 in the same manner as in Example 1, and the crystal structure thereof was identified by the XRD measurement. Table 1 shows the results.

Example 3

A powdery dielectric according to Example 3 was produced in the same manner as in Example 1, except that a raw material powder including KBr and $SnBr_2$ was prepared such that a ratio of the amount of substance of KBr to the amount of substance of $SnBr_2$ was 1:2. The composition of the dielectric according to Example 3 was determined by the XPS measurement in the same manner as in Example 1. Moreover, the relative permittivity was evaluated for the dielectric according to Example 3 in the same manner as in Example 1, and the crystal structure thereof was identified by the XRD measurement. Table 1 shows the results.

Example 4

A powdery dielectric according to Example 4 was produced in the same manner as in Example 1, except that a raw material powder including KCl and $SnCl_2$ was prepared such that a ratio of the amount of substance of K(SCN) to the amount of substance of $SnCl_2$ was 1:2. $SCN^-$ is a negative monovalent cluster anion, and was considered as one anion. The composition of the dielectric according to Example 4 was determined by the XPS measurement in the same manner as in Example 1. Moreover, the relative permittivity was evaluated for the dielectric according to Example 4 in the same manner as in Example 1, and the crystal structure thereof was identified by the XRD measurement. Table 1 shows the results.

Example 5

A powdery dielectric according to Example 5 was produced in the same manner as in Example 1, except that a raw material powder including KCl and $SnBr_2$ was prepared such that a ratio of the amount of substance of KCl to the amount of substance of $SnBr_2$ was 1:2. The composition of the dielectric according to Example 5 was determined by the XPS measurement in the same manner as in Example 1. Moreover, the relative permittivity was evaluated for the dielectric according to Example 5 in the same manner as in Example 1, and the crystal structure thereof was identified by the XRD measurement. Table 1 shows the results.

Example 6

A powdery dielectric according to Example 6 was produced in the same manner as in Example 1, except that a raw material powder including KI and $SnCl_2$ was prepared such that a ratio of the amount of substance of KI to the amount of substance of $SnCl_2$ was 1:2. The composition of the dielectric according to Example 6 was determined by the XPS measurement in the same manner as in Example 1. Moreover, the relative permittivity was evaluated for the dielectric according to Example 6 in the same manner as in Example 1, and the crystal structure thereof was identified by the XRD measurement. Table 1 shows the results.

Example 7

A powdery dielectric according to Example 7 was produced in the same manner as in Example 1, except that a raw material powder including KF, KCl, and $SnCl_2$ such that a ratio of the amount of substance of KF to the amount of substance of KCl to the amount of substance of $SnCl_2$ was 0.5:0.5:2. The composition of the dielectric according to Example 7 was determined by the XPS measurement in the same manner as in Example 1. Moreover, the relative permittivity was evaluated for the dielectric according to Example 7 in the same manner as in Example 1, and the crystal structure thereof was identified by the XRD measurement. Table 1 shows the results.

Example 8

A powdery dielectric according to Example 8 was produced in the same manner as in Example 1, except that a raw material powder including KI and $SnCl_2$ was prepared such that a ratio of the amount of substance of KI to the amount of substance of $SnCl_2$ was 1:2. The composition of the dielectric according to Example 8 was determined by the XPS measurement in the same manner as in Example 1. Moreover, the relative permittivity was evaluated for the dielectric according to Example 8 in the same manner as in Example 1, and the crystal structure thereof was identified by the XRD measurement. Table 1 shows the results.

Example 9

A powdery dielectric according to Example 9 was produced in the same manner as in Example 1, except that a raw material powder including KCl, $SnCl_2$, and $PbCl_2$ was prepared such that a ratio of the amount of substance of KCl to the amount of substance of $SnCl_2$ to the amount of substance of $PbCl_2$ was 1:1:1. The composition of the dielectric according to Example 9 was determined by the XPS measurement in the same manner as in Example 1. Moreover, the relative permittivity was evaluated for the dielectric according to Example 9 in the same manner as in Example 1, and the crystal structure thereof was identified by the XRD measurement. Table 1 shows the results.

Example 10

A powdery dielectric according to Example 10 was produced in the same manner as in Example 1, except that a raw material powder including RbCl and $SnCl_2$ was prepared such that a ratio of the amount of substance of RbCl to the amount of substance of $SnCl_2$ was 1:2. The composition of the dielectric according to Example 10 was determined by the XPS measurement in the same manner as in Example 1. Moreover, the relative permittivity was evaluated for the dielectric according to Example 10 in the same manner as in Example 1, and the crystal structure thereof was identified by the XRD measurement. Furthermore, the relative permittivity and the convex hull energy of the dielectric according to Example 10 were calculated in the same manner as in Example 1. Table 1 shows the results.

Example 11

A powdery dielectric according to Example 11 was produced in the same manner as in Example 1, except that a raw material powder including CsBr and $SnCl_2$ was prepared such that a ratio of the amount of substance of CsBr to the amount of substance of $SnCl_2$ was 1:2. The composition of the dielectric according to Example 11 was determined by the XPS measurement in the same manner as in Example 1. Moreover, the relative permittivity was evaluated for the dielectric according to Example 11 in the same manner as in Example 1, and the crystal structure thereof was identified by the XRD measurement. Table 1 shows the results.

Example 12

A powdery dielectric according to Example 12 was produced in the same manner as in Example 1, except that a raw material powder including CsCl and $SnCl_2$ was prepared such that a ratio of the amount of substance of CsCl to the amount of substance of $SnCl_2$ was 1:2. The composition of the dielectric according to Example 12 was determined by the XPS measurement in the same manner as in Example 1. Moreover, the relative permittivity was evaluated for the dielectric according to Example 12 in the same manner as in Example 1, and the crystal structure thereof was identified by the XRD measurement. Furthermore, the relative permittivity and the convex hull energy of the dielectric according to Example 12 were calculated in the same manner as in Example 1. Table 1 shows the results.

Example 13

A powdery dielectric according to Example 13 was produced in the same manner as in Example 1, except that a raw material powder including InI and $SnCl_2$ was prepared such that a ratio of the amount of substance of InI to the amount of substance of $SnCl_2$ was 1:2. The composition of the dielectric according to Example 13 was determined by the XPS measurement in the same manner as in Example 1. Moreover, the relative permittivity was evaluated for the dielectric according to Example 13 in the same manner as in Example 1, and the crystal structure thereof was identified by the XRD measurement. Table 1 shows the results.

Example 14

A powdery dielectric according to Example 14 was produced in the same manner as in Example 1, except that a raw material powder including InI and $SnI_2$ was prepared such that a ratio of the amount of substance of InI to the amount of substance of $SnI_2$ was 1:2. The composition of the dielectric according to Example 14 was determined by the XPS measurement in the same manner as in Example 1. Moreover, the relative permittivity was evaluated for the dielectric according to Example 14 in the same manner as in Example 1, and the crystal structure thereof was identified by the XRD measurement. Furthermore, the relative permittivity and the convex hull energy of the dielectric according to Example 14 were calculated in the same manner as in Example 1. Table 1 shows the results.

Comparative Example 1A

A powdery dielectric according to Comparative Example 1A was produced in the same manner as in Example 1, except that a raw material powder including CsCl and $PbCl_2$ was prepared such that a ratio of the amount of substance of CsCl to the amount of substance of $PbCl_2$ was 1:1. The composition of the dielectric according to Comparative Example 1A was determined by the XPS measurement in the same manner as in Example 1. Moreover, the relative permittivity was evaluated for the dielectric according to Comparative Example 1A in the same manner as in Example 1, and the crystal structure thereof was identified by the XRD measurement. Furthermore, the relative permittivity and the convex hull energy of the dielectric according to Comparative Example 1A were calculated in the same manner as in Example 1. Table 8 shows the results.

Comparative Example 2

Figure 22:
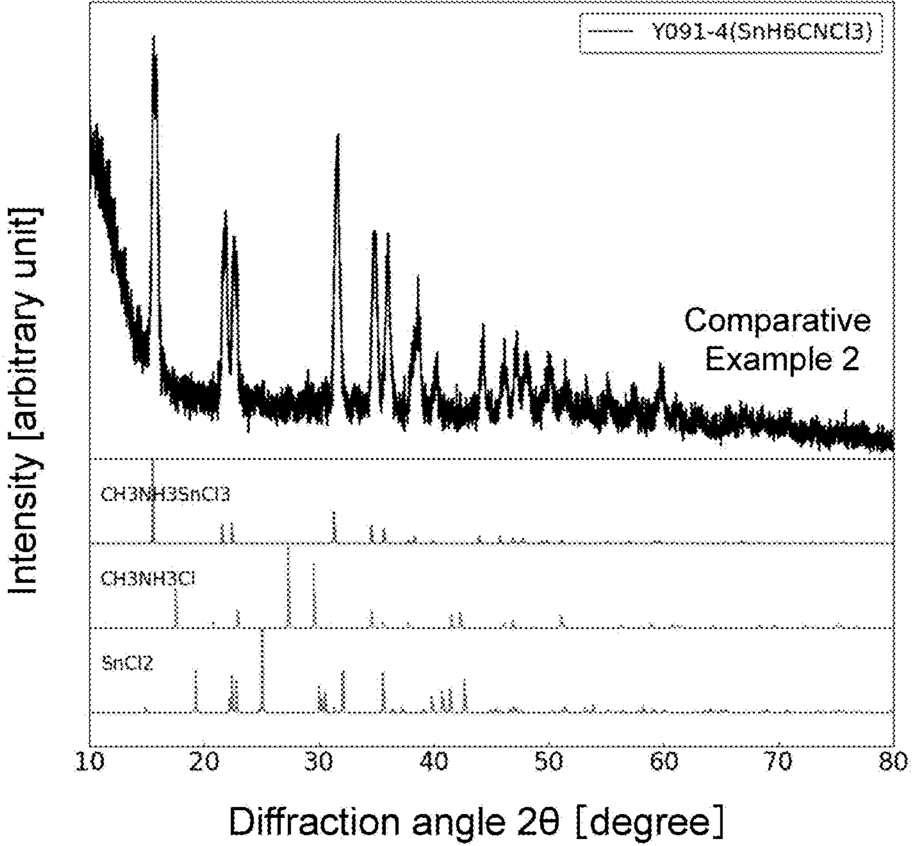
FIG. 22 is a graph showing an XRD pattern of a dielectric according to Comparative Example 2.

A powdery dielectric according to Comparative Example 2 was produced in the same manner as in Example 1, except that a raw material powder including $(CH_3NH_3)Cl$ and $SnCl_2$ was prepared such that a ratio of the amount of substance of $(CH_3NH_3)Cl$ to the amount of substance of $SnCl_2$ was 1:1. The composition of the dielectric according to Comparative Example 2 was determined by the XPS measurement in the same manner as in Example 1. Additionally, the relative permittivity was evaluated for the dielectric according to Comparative Example 2 in the same manner as in Example 1. Table 8 shows the results. FIG. 22 is a graph showing an XRD pattern of the dielectric according to Comparative Example 2. The horizontal axis indicates a diffraction angle 2θ, and the vertical axis indicates an intensity of X-ray diffraction. FIG. 22 also shows calculation results for XRD patterns of $CH_3NH_3SnCl_3$ of perovskite type, $(CH_3NH_3)Cl$, and $SnCl_2$. Note that the vertical axis in FIG. 22 shows a relative relation of a diffraction intensity in each XRD pattern, and does not show a relative relation of diffraction intensities between the different XRD patterns. The XRD pattern of the dielectric according to Comparative Example 2 confirms that the dielectric according to Comparative Example 2 has a perovskite-type crystal structure.

Comparative Example 3

A ferroelectric as described in Non Patent Literature 1 was chosen as a dielectric according to Comparative Example 3, the ferroelectric having an inverted perovskite structure and represented by $[(CH_3)_2(F—CH_2CH_2)\ NH]_3(CdCl_3)(CdCl_4)$. The relative permittivity of the dielectric according to Comparative Example 3 at room temperature and 1 MHz was as shown in FIG. 3(*c*). The relative permittivity of the dielectric according to Comparative Example 3 was 15.4 at room temperature and 1 MHz. The dielectric according to Comparative Example 3 can be produced with reference to EXPERIMENTAL SECTION in Non Patent Literature 1.

Example 15

A calculation model of a $(NH_4)Pb_2Br_5$-type inverted perovskite structure having a composition $CsSn_2Br_5$ was generated. In the generation of the calculation model, element substitution was performed for $(NH_4)\ Pb_2Br_5$ for 14/mcm symmetry, and a most stable structure was determined by first-principles calculation. The convex hull energy and the relative permittivity of the calculation model obtained were calculated by first-principle calculation in the same manner as in the evaluation of the possibility of synthesis by calculation and the evaluation of the relative permittivity by calculation in Example 1. Table 1 shows the results.

Example 16 to Example 50

Calculation models according to Example 16 to Example 50 were generated in the same manner as in Example 15, except that the compositions of the calculation models were changed as shown in Table 1, 2, and 3. The convex hull energy and the relative permittivity of each calculation model obtained were calculated by first-principles calculation in the same manner as in the evaluation of the possibility of synthesis by calculation and the evaluation of the relative permittivity by calculation in Example 1. Tables 1, 2, and 3 show the results.

Example 51

A calculation model of a $(NH_4)Pb_2Br_5$-type inverted perovskite structure having a composition $CsSnPbCl_5$ was generated. In the generation of the calculation model, element substitution was performed for $(NH_4)Pb_2Br_5$ for P4_2/mcm symmetry, and a most stable structure was determined by first-principles calculation. The convex hull energy and the relative permittivity of the calculation model obtained were calculated by first-principles calculation in the same manner as in the evaluation of the possibility of synthesis by calculation and the evaluation of the relative permittivity by calculation in Example 1. Table 3 shows the results.

Example 52 to Example 60

Calculation models according to Example 52 to Example 60 were generated in the same manner as in Example 51, except that the compositions of the calculation models were changed as shown in Table 3. The convex hull energy and the relative permittivity of each calculation model obtained were calculated by first-principles calculation in the same manner as in the evaluation of the possibility of synthesis by calculation and the evaluation of the relative permittivity by calculation in Example 1. Table 3 shows the results.

Example 61

A calculation model of a $(NH_4)Pb_2Br_5$-type inverted perovskite structure having a composition $CsIn(Pb_2Cl_5)_2$ was generated. In the generation of the calculation model, element substitution was performed for $(NH_4)Pb_2Br_5$ for $P_4$/mcc symmetry, and a most stable structure was determined by first-principles calculation. The convex hull energy and the relative permittivity of the calculation model obtained were calculated by first-principles calculation in the same manner as in the evaluation of the possibility of synthesis by calculation and the evaluation of the relative permittivity by calculation in Example 1. Table 4 shows the results.

Example 62 to Example 105

Calculation models according to Example 62 to Example 105 were generated in the same manner as in Example 61, except that the compositions of the calculation models were changed as shown in Tables 4, 5, and 6. The convex hull energy and the relative permittivity of each calculation model obtained were calculated by first-principles calculation in the same manner as in the evaluation of the possibility of synthesis by calculation and the evaluation of the relative permittivity by calculation in Example 1. Tables 4, 5, and 6 show the results.

Example 106

A calculation model of a $Cs_3CoCl_5$-type inverted perovskite structure having a composition ZnInsCls was generated. In the generation of the calculation model, element substitution was performed for $Cs_3CoCl_5$ for 14/mcm symmetry, and a most stable structure was determined by first-principles calculation. The convex hull energy and the relative permittivity of the calculation model obtained were calculated by first-principles calculation in the same manner as in the evaluation of the possibility of synthesis by calculation and the evaluation of the relative permittivity by calculation in Example 1. Table 6 shows the results.

Example 107 to Example 123

Calculation models according to Example 107 to Example 123 were generated in the same manner as in Example 106, except that the compositions of the calculation models were changed as shown in Tables 6 and 7. The convex hull energy and the relative permittivity of each calculation model obtained were calculated by first-principles calculation in the same manner as in the evaluation of the possibility of synthesis by calculation and the evaluation of the relative permittivity by calculation in Example 1. Tables 6 and 7 show the results.

Example 124

A calculation model of a $La_2SbCuS_5$-type inverted perovskite structure having a composition $InBa_2SbS_5$ was generated. In the generation of the calculation model, element substitution was performed for $La_2SbCuS_5$ for Ima2 symmetry, and a most stable structure was determined by first-principles calculation. The convex hull energy and the relative permittivity of the calculation model obtained were calculated by first-principles calculation in the same manner as in the evaluation of the possibility of synthesis by calculation and the evaluation of the relative permittivity by calculation in Example 1. Table 7 shows the results.

Example 125 to Example 135

Calculation models according to Example 125 to Example 135 were generated in the same manner as in Example 124, except that the compositions of the calculation models were changed as shown in Table 7. The convex hull energy and the relative permittivity of each calculation model obtained were calculated by first-principles calculation in the same manner as in the evaluation of the possibility of synthesis by calculation and the evaluation of the relative permittivity by calculation in Example 1. Table 7 shows the results.

Example 136

A calculation model of a $La_4FeSb_2S_{10}$-type inverted perovskite structure having a composition $Pb_2In_4ZnF_{10}$ was generated. In the generation of the calculation model, element substitution was performed for $La_4FeSb_2S_{10}$ for Pbcm symmetry, and a most stable structure was determined by first-principles calculation. The convex hull energy and the relative permittivity of the calculation model obtained were calculated by first-principles calculation in the same manner as in the evaluation of the possibility of synthesis by calculation and the evaluation of the relative permittivity by calculation in Example 1. Table 7 shows the results.

Example 137 to Example 149

Calculation models according to Example 137 to Example 149 were generated in the same manner as in Example 136, except that the compositions of the calculation models were changed as shown in Tables 7 and 8. The convex hull energy and the relative permittivity of each calculation model obtained were calculated by first-principles calculation in the same manner as in the evaluation of the possibility of synthesis by calculation and the evaluation of the relative permittivity by calculation in Example 1. Tables 7 and 8 show the results.

Example 150

A calculation model of a $Ba_4In_2Te_2S_5$-type inverted perovskite structure having a composition $Al_2Pb_4S_7$ was generated. In the generation of the calculation model, element substitution was performed for $La_4FeSb_2S_{10}$ for $P_4$/mbm symmetry, and a most stable structure was determined by first-principles calculation. The convex hull energy and the relative permittivity of the calculation model obtained were calculated by first-principles calculation in the same manner as in the evaluation of the possibility of synthesis by calculation and the evaluation of the relative permittivity by calculation in Example 1. Table 8 shows the results.

Example 151 and Example 152

Calculation models according to Example 151 and Example 152 were generated in the same manner as in Example 150, except that the compositions of the calculation models were changed as shown in Table 8. The convex hull energy and the relative permittivity of each calculation model obtained were calculated by first-principles calculation in the same manner as in the evaluation of the possibility of synthesis by calculation and the evaluation of the relative permittivity by calculation in Example 1. Table 8 shows the results.

Comparative Example 1B

A calculation model of a perovskite structure that had a composition $CsPbCl_3$ and in which $Cl^-$ is present at each vertex of face-sharing octahedra and $Pb_{2+}$ is present at the center of each of the octahedra was generated. The relative permittivity of the calculation model was calculated by first-principles calculation in the same manner as in the evaluation of the relative permittivity by calculation in Example 1. Table 8 shows the result.

FIGS. 21 and 22 confirm that while the dielectric according to Comparative Example 2 has a perovskite structure, the dielectric according to Example 1 has a $(NH_4)Pb_2Br_5$-type inverted perovskite structure. The XRD patterns of the dielectrics according to Examples 2 to 14 confirm that the dielectrics according to Examples 2 to 14 also have a $(NH_4)Pb_2Br_5$-type inverted perovskite structure. As shown in Tables 1 to 8, the actual measured values and the calculation values of the relative permittivities of the dielectrics and the calculation models according to Example 1 to Example 152 are more than 40. The dielectrics according to these Examples each have an inverted perovskite structure in which a cation is present at each vertex of corner-sharing octahedra and an anion is present at the center of each of the octahedra. The relative permittivities of the perovskite-type dielectrics according to Comparative Examples 1A and 2 are less than 40.0. Additionally, the relative permittivity of the dielectric according to Comparative Example 3 having an inverted perovskite structure in which a cation is present at each vertex of face-sharing octahedra and an anion is present at the center of each of the octahedra is also less than 40. Therefore, the calculated polarization values of Examples 1, 3, 5, 8, 10, 12, and 14 to 152 are higher than those of Comparative Examples 1A and 1B. Comparison between Comparative Examples 1A and 1B reveals that a compound having a perovskite structure in which octahedra are corner-sharing has a higher relative permittivity than a compound having a perovskite structure in which octahedra are face-sharing. Therefore, it is understood that an inverted perovskite structure having a portion in which a cation is present at each vertex of corner-sharing octahedra and an anion is present at the center of each of the octahedra is advantageous to achieve a high relative permittivity.

According to the following document, a material is synthesizable when having a convex hull energy of 0.1 eV/atom or less. This suggests that, as shown in Table 1, the compounds of the calculation models according to Examples 15 to 152 are synthesizable. S. Wenhao, et al. "The thermodynamic scale of inorganic crystalline metastability." Science advances 2.11 (2016):e1600225.

TABLE 1

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 1 | $KSn_2Cl_5$ | Inverted perovskite | Corner-sharing | $DE_2Q_5$ | 119 | 59 | 0 | 48 |
| Ex. 2 | $KSn_2Cl_4Br$ | Inverted perovskite | Corner-sharing | $DE_2Q_4R$ | 184 | — | — | — |
| Ex. 3 | $KSn_2$Br5 | Inverted perovskite | Corner-sharing | $DE_2Q_5$ | 50.4 | 64 | 1 | 52 |
| Ex. 4 | $KSn_2Cl_4$(SCN) | Inverted perovskite | Corner-sharing | $DE_2Q_4R$ | 84 | — | — | — |
| Ex. 5 | $KSn_2Br_4Cl$ | Inverted perovskite | Corner-sharing | $DE_2Q_5$ | 104 | 85 | 0 | 69 |
| Ex. 6 | $KSn_2Cl_4I$ | Inverted perovskite | Corner-sharing | $DE_2Q_4R$ | 45.2 | — | — | — |
| Ex. 7 | $KSn_2F_{0.5}Cl_{4.5}$ | Inverted perovskite | Corner-sharing | $DE_2Q_5$ | 162 | — | — | — |
| Ex. 8 | $KSn_2I_5$ | Inverted perovskite | Corner-sharing | $DE_2Q_5$ | 132 | 174 | 22 | 143 |
| Ex. 9 | $KSnPbCl_5$ | Inverted perovskite | Corner-sharing | $DE_2Q_5$ | 156 | — | — | — |
| Ex. 10 | $RbSn_2Cl_5$ | Inverted perovskite | Corner-sharing | $DE_2Q_5$ | 69.3 | 67 | 0 | 54 |

TABLE 1-continued

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 11 | $CsSn_2Cl_4Br$ | Inverted perovskite | Corner-sharing | $DE_2Q_4R$ | 66 | — | — | — |
| Ex. 12 | $CsSn_2Cl_5$ | Inverted perovskite | Corner-sharing | $DE_2Q_5$ | 51.7 | 79.5 | 0 | 65.1 |
| Ex. 13 | $InSn_2Cl_4I$ | Inverted perovskite | Corner-sharing | $DE_2Q_4R$ | 53.5 | — | — | — |
| Ex. 14 | $InSn_2I_5$ | Inverted perovskite | Corner-sharing | $DE_2Q_5$ | 300 | 187 | 25 | 154 |
| Ex. 15 | $CsSn_2Br_5$ | Inverted perovskite | Corner-sharing | $DE_2Q_5$ | — | 122 | 4 | 100 |
| Ex. 16 | $CsSn_2Cl_5$ | Inverted perovskite | Corner-sharing | $DE_2Q_5$ | — | 84 | 0 | 69 |
| Ex. 17 | $InPb_2Br_5$ | Inverted perovskite | Corner-sharing | $DE_2Q_5$ | — | 86 | 12 | 71 |
| Ex. 18 | $InPb_2Cl_5$ | Inverted perovskite | Corner-sharing | $DE_2Q_5$ | — | 70 | 16 | 57 |
| Ex. 19 | $InSn_2Br_5$ | Inverted perovskite | Corner-sharing | $DE_2Q_5$ | — | 108 | 4 | 89 |
| Ex. 20 | $InSn_2Cl_5$ | Inverted perovskite | Corner-sharing | $DE_2Q_5$ | — | 109 | 7 | 90 |

TABLE 2

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 21 | $KPb_2F_5$ | Inverted perovskite | Corner-sharing | $DE_2Q_5$ | — | 89 | 70 | 73 |
| Ex. 22 | $NaPb_2Br_5$ | Inverted perovskite | Corner-sharing | $DE_2Q_5$ | — | 133 | 56 | 109 |
| Ex. 23 | $NaSn_2I_5$ | Inverted perovskite | Corner-sharing | $DE_2Q_5$ | — | 85 | 62 | 69 |
| Ex. 24 | $RbSn_2Br_5$ | Inverted perovskite | Corner-sharing | $DE_2Q_5$ | — | 73 | 0 | 60 |
| Ex. 25 | $RbSn_2Cl_5$ | Inverted perovskite | Corner-sharing | $DE_2Q_5$ | — | 67 | 0 | 54 |
| Ex. 26 | $RbSn_2I_5$ | Inverted perovskite | Corner-sharing | $DE_2Q_5$ | — | 610 | 4 | 505 |
| Ex. 27 | $TlPb_2I_5$ | Inverted perovskite | Corner-sharing | $DE_2Q_5$ | — | 63 | 53 | 51 |
| Ex. 28 | $TlSn_2Br_5$ | Inverted perovskite | Corner-sharing | $DE_2Q_5$ | — | 78 | 0 | 64 |
| Ex. 29 | $TlSn_2Cl_5$ | Inverted perovskite | Corner-sharing | $DE_2Q_5$ | — | 80 | 0 | 65 |
| Ex. 30 | $Sr_2InBr_5$ | Inverted perovskite | Corner-sharing | $DE_2Q_5$ | — | 184 | 0 | 152 |
| Ex. 31 | $Sr_2InI_5$ | Inverted perovskite | Corner-sharing | $DE_2Q_5$ | — | 54 | 0 | 44 |
| Ex. 32 | $Sr_2TlI_5$ | Inverted perovskite | Corner-sharing | $DE_2Q_5$ | — | 125 | 0 | 103 |
| Ex. 33 | $BaPb_2SCl_4$ | Inverted perovskite | Corner-sharing | $DE_2Q_4R$ | — | 79 | 64 | 64 |
| Ex. 34 | $CsPb_2Br_4Cl$ | Inverted perovskite | Corner-sharing | $DE_2Q_4R$ | — | 85 | 1 | 70 |
| Ex. 35 | $InPb_2Br_4Cl$ | Inverted perovskite | Corner-sharing | $DE_2Q_4R$ | — | 88 | 8 | 72 |
| Ex. 36 | $InPb_2I_4Br$ | Inverted perovskite | Corner-sharing | $DE_2Q_4R$ | — | 101 | 0 | 83 |
| Ex. 37 | $InPb_2IBr_4$ | Inverted perovskite | Corner-sharing | $DE_2Q_4R$ | — | 170 | 50 | 140 |
| Ex. 38 | $InSn_2Br_4Cl$ | Inverted perovskite | Corner-sharing | $DE_2Q_4R$ | — | 133 | 0 | 110 |
| Ex. 39 | $InSn_2BrCl_4$ | Inverted perovskite | Corner-sharing | $DE_2Q_4R$ | — | 68 | 58 | 55 |
| Ex. 40 | $InSn_2I_4Br$ | Inverted perovskite | Corner-sharing | $DE_2Q_4R$ | — | 108 | 0 | 89 |

TABLE 3

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 41 | $InSn_2IBr_4$ | Inverted perovskite | Corner-sharing | $DE_2Q_4R$ | — | 152 | 0 | 125 |
| Ex. 42 | $KPb_2I_4Br$ | Inverted perovskite | Corner-sharing | $DE_2Q_4R$ | — | 191 | 0 | 158 |
| Ex. 43 | $NaSn_2Br_4Cl$ | Inverted perovskite | Corner-sharing | $DE_2Q_4R$ | — | 361 | 0 | 299 |
| Ex. 44 | $NaSn_2I_4Br$ | Inverted perovskite | Corner-sharing | $DE_2Q_4R$ | — | 126 | 69 | 104 |
| Ex. 45 | $RbPb_2Br_4Cl$ | Inverted perovskite | Corner-sharing | $DE_2Q_4R$ | — | 52 | 1 | 42 |
| Ex. 46 | $RbSn_2Br_4Cl$ | Inverted perovskite | Corner-sharing | $DE_2Q_4R$ | — | 51 | 0 | 41 |
| Ex. 47 | $TlPb_2Br_4Cl$ | Inverted perovskite | Corner-sharing | $DE_2Q_4R$ | — | 57 | 0 | 46 |
| Ex. 48 | $TlPb_2BrCl_4$ | Inverted perovskite | Corner-sharing | $DE_2Q_4R$ | — | 54 | 31 | 44 |
| Ex. 49 | $TlPb_2IBr_4$ | Inverted perovskite | Corner-sharing | $DE_2Q_4R$ | — | 85 | 0 | 70 |
| Ex. 50 | $TlSn_2Br_4Cl$ | Inverted perovskite | Corner-sharing | $DE_2Q_4R$ | — | 119 | 0 | 98 |
| Ex. 51 | $CsSnPbCl_5$ | Inverted perovskite | Corner-sharing | $DEGQ_5$ | — | 155 | 6 | 128 |
| Ex. 52 | $CuSnPbI_5$ | Inverted perovskite | Corner-sharing | $DEGQ_5$ | — | 52 | 0 | 42 |
| Ex. 53 | $InSnPbI_5$ | Inverted perovskite | Comer-sharing | $DEGQ_5$ | — | 239 | 0 | 197 |
| Ex. 54 | $KSnPbBr_5$ | Inverted perovskite | Corner-sharing | $DEGQ_5$ | — | 101 | 0 | 83 |
| Ex. 55 | $KSnPbI_5$ | Inverted perovskite | Corner-sharing | $DEGQ_5$ | — | 52 | 0 | 43 |
| Ex. 56 | $NaSnPbBr_5$ | Inverted perovskite | Corner-sharing | $DEGQ_5$ | — | 58 | 52 | 47 |
| Ex. 57 | $RbSnPbBr_5$ | Inverted perovskite | Corner-sharing | $DEGQ_5$ | — | 127 | 0 | 104 |
| Ex. 58 | $RbSnPbCl_5$ | Inverted perovskite | Corner-sharing | $DEGQ_5$ | — | 144 | 0 | 118 |
| Ex. 59 | $TlSnPbBr_5$ | Inverted perovskite | Corner-sharing | $DEGQ_5$ | — | 109 | 0 | 90 |
| Ex. 60 | $TlSnPbI_5$ | Inverted perovskite | Corner-sharing | $DEGQ_5$ | — | 60 | 0 | 49 |

TABLE 4

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 61 | $CsIn(Pb_2Cl_5)_2$ | Inverted perovskite | Corner-sharing | $DEG_4Q_{10}$ | — | 77 | 11 | 63 |
| Ex. 62 | $CsIn(Sn_2Br_5)_2$ | Inverted perovskite | Corner-sharing | $DEG_4Q_{10}$ | — | 236 | 0 | 195 |
| Ex. 63 | $CsIn(Sn_2I_5)_2$ | Inverted perovskite | Corner-sharing | $DEG_4Q_{10}$ | — | 118 | 0 | 97 |
| Ex. 64 | $CsK(Pb_2I_5)_2$ | Inverted perovskite | Corner-sharing | $DEG_4Q_{10}$ | — | 56 | 0 | 46 |
| Ex. 65 | $CsK(Sn_2Br_5)_2$ | Inverted perovskite | Corner-sharing | $DEG_4Q_{10}$ | — | 93 | 0 | 76 |
| Ex. 66 | $CsK(Sn_2Cl_5)_2$ | Inverted perovskite | Corner-sharing | $DEG_4Q_{10}$ | — | 76 | 0 | 63 |
| Ex. 67 | $CsNa(Sn_2Br_5)_2$ | Inverted perovskite | Corner-sharing | $DEG_4Q_{10}$ | — | 92 | 28 | 76 |
| Ex. 68 | $CsNa(Sn_2I_5)_2$ | Inverted perovskite | Corner-sharing | $DEG_4Q_{10}$ | — | 796 | 44 | 659 |
| Ex. 69 | $CsRb(Pb_2I_5)_2$ | Inverted perovskite | Corner-sharing | $DEG_4Q_{10}$ | — | 58 | 0 | 47 |
| Ex. 70 | $CsRb(Sn_2Br_5)_2$ | Inverted perovskite | Corner-sharing | $DEG_4Q_{10}$ | — | 126 | 0 | 104 |
| Ex. 71 | $CsRb(Sn_2Cl_5)_2$ | Inverted perovskite | Corner-sharing | $DEG_4Q_{10}$ | — | 90 | 0 | 74 |
| Ex. 72 | $CsTl(Sn_2Br_5)_2$ | Inverted perovskite | Corner-sharing | $DEG_4Q_{10}$ | — | 136 | 4 | 112 |
| Ex. 73 | $CsTl(Sn_2Cl_5)_2$ | Inverted perovskite | Corner-sharing | $DEG_4Q_{10}$ | — | 95 | 0 | 78 |
| Ex. 74 | $KIn(Pb_2Br_5)_2$ | Inverted perovskite | Corner-sharing | $DEG_4Q_{10}$ | — | 57 | 10 | 46 |
| Ex. 75 | $KIn(Pb_2I_5)_2$ | Inverted perovskite | Corner-sharing | $DEG_4Q_{10}$ | — | 98 | 0 | 80 |
| Ex. 76 | $KIn(Sn_2Br_5)_2$ | Inverted perovskite | Corner-sharing | $DEG_4Q_{10}$ | — | 120 | 2 | 99 |
| Ex. 77 | $KIn(Sn_2Cl_5)_2$ | Inverted perovskite | Corner-sharing | $DEG_4Q_{10}$ | — | 102 | 4 | 84 |
| Ex. 78 | $KIn(Sn_2I_5)_2$ | Inverted perovskite | Corner-sharing | $DEG_4Q_{10}$ | — | 874 | 0 | 724 |
| Ex. 79 | $KNa(Sn_2Br_5)_2$ | Inverted perovskite | Corner-sharing | $DEG_4Q_{10}$ | — | 60 | 0 | 49 |
| Ex. 80 | $KNa(Sn_2Cl_5)_2$ | Inverted perovskite | Corner-sharing | $DEG_4Q_{10}$ | — | 157 | 0 | 129 |

TABLE 5

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 81 | $KNa(Sn_2I_5)_2$ | Inverted perovskite | Corner-sharing | $DEG_4Q_{10}$ | — | 214 | 43 | 176 |
| Ex. 82 | $KRb(Sn_2Br_5)_2$ | Inverted perovskite | Corner-sharing | $DEG_4Q_{10}$ | — | 79 | 1 | 65 |
| Ex. 83 | $KRb(Sn_2Cl_5)_2$ | Inverted perovskite | Corner-sharing | $DEG_4Q_{10}$ | — | 66 | 0 | 54 |
| Ex. 84 | $KTl(Pb_2I_5)_2$ | Inverted perovskite | Corner-sharing | $DEG_4Q_{10}$ | — | 66 | 41 | 54 |
| Ex. 85 | $KTl(Sn_2Br_5)_2$ | Inverted perovskite | Corner-sharing | $DEG_4Q_{10}$ | — | 85 | 0 | 69 |
| Ex. 86 | $KTl(Sn_2Cl_5)_2$ | Inverted perovskite | Corner-sharing | $DEG_4Q_{10}$ | — | 79 | 0 | 64 |
| Ex. 87 | $KTl(Sn_2I_5)_2$ | Inverted perovskite | Corner-sharing | $DEG_4Q_{10}$ | — | 417 | 0 | 345 |
| Ex. 88 | $NaIn(Sn_2Br_5)_2$ | Inverted perovskite | Corner-sharing | $DEG_4Q_{10}$ | — | 134 | 25 | 110 |
| Ex. 89 | $NaIn(Sn_2Cl_5)_2$ | Inverted perovskite | Corner-sharing | $DEG_4Q_{10}$ | — | 282 | 0 | 233 |
| Ex. 90 | $NaIn(Sn_2I_5)_2$ | Inverted perovskite | Corner-sharing | $DEG_4Q_{10}$ | — | 338 | 44 | 279 |
| Ex. 91 | $NaTl(Sn_2Br_5)_2$ | Inverted perovskite | Corner-sharing | $DEG_4Q_{10}$ | — | 102 | 22 | 84 |

TABLE 5-continued

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 92 | $NaTl(Sn_2Cl_5)_2$ | Inverted perovskite | Corner-sharing | $DEG_4Q_{10}$ | — | 201 | 18 | 166 |
| Ex. 93 | $NaTl(Sn_2I_5)_2$ | Inverted perovskite | Corner-sharing | $DEG_4Q_{10}$ | — | 195 | 0 | 161 |
| Ex. 94 | $RbIn(Pb_2Br_5)_2$ | Inverted perovskite | Corner-sharing | $DEG_4Q_{10}$ | — | 61 | 0 | 50 |
| Ex. 95 | $RbIn(Sn_2I_5)_2$ | Inverted perovskite | Corner-sharing | $DEG_4Q_{10}$ | — | 1446 | 0 | 1198 |
| Ex. 96 | $RbNa(Pb_2Br_5)_2$ | Inverted perovskite | Corner-sharing | $DEG_4Q_{10}$ | — | 58 | 31 | 48 |
| Ex. 97 | $RbNa(Sn_2Br_5)_2$ | Inverted perovskite | Corner-sharing | $DEG_4Q_{10}$ | — | 61 | 0 | 50 |
| Ex. 98 | $RbNa(Sn_2Cl_5)_2$ | Inverted perovskite | Corner-sharing | $DEG_4Q_{10}$ | — | 115 | 0 | 94 |
| Ex. 99 | $RbNa(Sn_2I_5)_2$ | Inverted perovskite | Corner-sharing | $DEG_4Q_{10}$ | — | 247 | 34 | 204 |
| Ex. 100 | $RbTl(Pb2I_5)_2$ | Inverted perovskite | Corner-sharing | $DEG_4Q_{10}$ | — | 80 | 0 | 65 |

TABLE 6

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 101 | $RbTl(Sn_2Br_5)_2$ | Inverted perovskite | Corner-sharing | $DEG_4Q_{10}$ | — | 99 | 0 | 82 |
| Ex. 102 | $RbTl(Sn_2I_5)_2$ | Inverted perovskite | Corner-sharing | $DEG_4Q_{10}$ | — | 1888 | 0 | 1566 |
| Ex. 103 | $TlIn(Pb_2Br_5)_2$ | Inverted perovskite | Corner-sharing | $DEG_4Q_{10}$ | — | 63 | 10 | 51 |
| Ex. 104 | $TlIn(Sn_2Br_5)_2$ | Inverted perovskite | Corner-sharing | $DEG_4Q_{10}$ | — | 104 | 0 | 86 |
| Ex. 105 | $TlIn(Sn_2I_5)_2$ | Inverted perovskite | Corner-sharing | $DEG_4Q_{10}$ | — | 255 | 0 | 211 |
| Ex. 106 | $ZnIn_3Cl_5$ | Inverted perovskite | Corner-sharing | $D_3EQ_5$ | — | 61 | 3 | 50 |
| Ex. 107 | $TlBa_2GeO_4F$ | Inverted perovskite | Corner-sharing | $D_3EQ_4R$ | — | 217 | 52 | 180 |
| Ex. 108 | $TlBa_2GeS_4Cl$ | Inverted perovskite | Corner-sharing | $D_3EQ_4R$ | — | 104 | 30 | 86 |
| Ex. 109 | $TlBa_2SiS_4Cl$ | Inverted perovskite | Corner-sharing | $D_3EQ_4R$ | — | 139 | 36 | 114 |
| Ex. 110 | $InSr_2GeS_4Br$ | Inverted perovskite | Corner-sharing | $D_3EQ_4R$ | — | 99 | 96 | 82 |
| Ex. 111 | $InSr_2SiS_4Br$ | Inverted perovskite | Corner-sharing | $D_3EQ_4R$ | — | 156 | 68 | 128 |
| Ex. 112 | $InSr_2TiS_4Cl$ | Inverted perovskite | Corner-sharing | $D_3EQ_4R$ | — | 86 | 85 | 70 |
| Ex. 113 | $TlIn_2BeCl_5$ | Inverted perovskite | Corner-sharing | $DE_2GQ_5$ | — | 54 | 0 | 44 |
| Ex. 114 | $CsTl_2CdCl_5$ | Inverted perovskite | Corner-sharing | $DE_2GQ_5$ | — | 76 | 0 | 62 |
| Ex. 115 | $KIn_2ZnCl_5$ | Inverted perovskite | Corner-sharing | $DE_2GQ_5$ | — | 50 | 0 | 41 |
| Ex. 116 | $NaAg_2PbCl_5$ | Inverted perovskite | Corner-sharing | $DE_2GQ_5$ | — | 66 | 0 | 54 |
| Ex. 117 | $RbIn_2BeCl_5$ | Inverted perovskite | Corner-sharing | $DE_2GQ_5$ | — | 63 | 0 | 51 |
| Ex. 118 | $RbIn_2CaCl_5$ | Inverted perovskite | Corner-sharing | $DE_2GQ_5$ | — | 69 | 0 | 56 |
| Ex. 119 | $RbIn_2CdCl_5$ | Inverted perovskite | Corner-sharing | $DE_2GQ_5$ | — | 89 | 20 | 73 |
| Ex. 120 | $RbIn_2ZnCl_5$ | Inverted perovskite | Corner-sharing | $DE_2GQ_5$ | — | 320 | 0 | 264 |

TABLE 7

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 121 | $TlIn_2CdCl_5$ | Inverted perovskite | Corner-sharing | $DE_2GQ_5$ | — | 64 | 0 | 52 |

TABLE 7-continued

| | Composition | Structure | Link of octahedra | Composition formula | Actual measured value of relative permittivity | Calculation value of relative permittivity | Convex hull energy (meV/atom) | Calculation value of polarization [mC/cm$^2$] |
|---|---|---|---|---|---|---|---|---|
| Ex. 122 | $TlIn_2ZnCl_5$ | Inverted perovskite | Corner-sharing | $DE_2GQ_5$ | — | 59 | 0 | 49 |
| Ex. 123 | $InPb_2GeS_4Cl$ | Inverted perovskite | Corner-sharing | $DE_2GQ_4R$ | — | 208 | 84 | 171 |
| Ex. 124 | $InBa_2SbS_5$ | Inverted perovskite | Corner-sharing | $DE_2GQ_5$ | — | 56 | 0 | 45 |
| Ex. 125 | $ScBa_2SbS_5$ | Inverted perovskite | Corner-sharing | $DE_2GQ_5$ | — | 68 | 0 | 56 |
| Ex. 126 | $CsBi_2SbS_5$ | Inverted perovskite | Corner-sharing | $DE_2GQ_5$ | — | 58 | 0 | 48 |
| Ex. 127 | $BiSb_2CuO_5$ | Inverted perovskite | Corner-sharing | $DE_2GQ_5$ | — | 87 | 0 | 71 |
| Ex. 128 | $BiSb_2CuS_5$ | Inverted perovskite | Corner-sharing | $DE_2GQ_5$ | — | 87 | 0 | 71 |
| Ex. 129 | $BiGe_2GaO_5$ | Inverted perovskite | Corner-sharing | $DE_2GQ_5$ | — | 185 | 0 | 152 |
| Ex. 130 | $SbPb_2GaO_5$ | Inverted perovskite | Corner-sharing | $DE_2GQ_5$ | — | 90 | 0 | 74 |
| Ex. 131 | $SbBi_2LiO_5$ | Inverted perovskite | Corner-sharing | $DE_2GQ_5$ | — | 53 | 48 | 43 |
| Ex. 132 | $SbSn_2BS_5$ | Inverted perovskite | Corner-sharing | $DE_2GQ_5$ | — | 58 | 0 | 47 |
| Ex. 133 | $SbSr_2AlS_5$ | Inverted perovskite | Corner-sharing | $DE_2GQ_5$ | — | 55 | 0 | 45 |
| Ex. 134 | $BiSr_2GaS_5$ | Inverted perovskite | Corner-sharing | $DE_2GQ_5$ | — | 53 | 0 | 43 |
| Ex. 135 | $SbSr_2GaS_5$ | Inverted perovskite | Corner-sharing | $DE_2GQ_5$ | — | 70 | 0 | 57 |
| Ex. 136 | $Pb_2In_4ZnF_{10}$ | Inverted perovskite | Corner-sharing | $D_2E_4GQ_{10}$ | — | 282 | 0 | 233 |
| Ex. 137 | $Pb_2In_4ZnCl_{10}$ | Inverted perovskite | Corner-sharing | $D_2E_4GQ_{10}$ | — | 135 | 10 | 111 |
| Ex. 138 | $Sn_2In_4SrCl_{10}$ | Inverted perovskite | Corner-sharing | $D_2E_4GQ_{10}$ | — | 129 | 0 | 106 |
| Ex. 139 | $Pb_2In_4GeCl_{10}$ | Inverted perovskite | Corner-sharing | $D_2E_4GQ_{10}$ | — | 105 | 0 | 86 |
| Ex. 140 | $Pb_2In_4MgCl_{10}$ | Inverted perovskite | Corner-sharing | $D_2E_4GQ_{10}$ | — | 90 | 0 | 74 |

TABLE 8

| | Composition | Structure | Link of octahedra | Composition formula | Actual measured value of relative permittivity | Calculation value of relative permittivity | Convex hull energy (meV/atom) | Calculation value of polarization [mC/cm$_2$] |
|---|---|---|---|---|---|---|---|---|
| Ex. 141 | $Pb_2In_4CdCl_{10}$ | Inverted perovskite | Corner-sharing | $D_2E_4GQ_{10}$ | — | 86 | 0 | 71 |
| Ex. 142 | $Pb_2T_4ZnCl_{10}$ | Inverted perovskite | Corner-sharing | $D_2E_4GQ_{10}$ | — | 78 | 0 | 64 |
| Ex. 143 | $Sn_2T_4ZnF_{10}$ | Inverted perovskite | Corner-sharing | $D_2E_4GQ_{10}$ | — | 74 | 0 | 61 |
| Ex. 144 | $Sn_2Tl_4BaCl_{10}$ | Inverted perovskite | Corner-sharing | $D_2E_4GQ_{10}$ | — | 66 | 0 | 54 |
| Ex. 145 | $Sn_2In_4GeCl_{10}$ | Inverted perovskite | Corner-sharing | $D_2E_4GQ_{10}$ | — | 63 | 0 | 51 |
| Ex. 146 | $Sn_2In_4CdCl_{10}$ | Inverted perovskite | Corner-sharing | $D_2E_4GQ_{10}$ | — | 61 | 0 | 50 |
| Ex. 147 | $Sn_2T_4MgCl_{10}$ | Inverted perovskite | Corner-sharing | $D_2E_4GQ_{10}$ | — | 53 | 0 | 43 |
| Ex. 148 | $Sn_2In_4PbCl_{10}$ | Inverted perovskite | Corner-sharing | $D_2E_4GQ_{10}$ | — | 54 | 0 | 44 |
| Ex. 149 | $Sn_2In_4ZnCl_{10}$ | Inverted perovskite | Corner-sharing | $D_2E_4GQ_{10}$ | — | 54 | 0 | 44 |
| Ex. 150 | $Al_2Pb_4S_7$ | Inverted perovskite | Corner-sharing | $D_2E_4Q_7$ | — | 171 | 43 | 141 |
| Ex. 151 | $B_2Pb_4S_7$ | Inverted perovskite | Corner-sharing | $D_2E_4Q_7$ | — | 129 | 80 | 107 |
| Ex. 152 | $GazPb_4S_7$ | Inverted perovskite | Corner-sharing | $D_2E_4Q_7$ | — | 245 | 53 | 202 |

TABLE 8-continued

| | Composition | Structure | Link of octahedra | Composition formula | Actual measured value of relative permittivity | Calculation value of relative permittivity | Convex hull energy (meV/atom) | Calculation value of polarization [mC/cm$_2$] |
|---|---|---|---|---|---|---|---|---|
| Comp. Ex. 1A | $CsPbCl_3$ | Perovskite | Corner-sharing | $ABX_3$ | 39.6 | 39.4 | 0 | 31.9 |
| Comp. Ex. 1B | $CsPbCl_3$ | Perovskite | Face-sharing | $ABX_3$ | — | 10.1 | — | 7.5 |
| Comp. Ex. 2 | $(CH_3NH_3)\ SnCl_3$ | Perovskite | Corner-sharing | $ABX_3$ | 22.3 | — | — | — |
| Comp. Ex. 3 | $[(CH_3)_2(F{-}CH_2CH_2)NH]_3(CdCl_4)(CdCl_3)$ | Inverted perovskite | Face-sharing | $D_3E_2Q_7$ | 15.4 | — | — | — |

INDUSTRIAL APPLICABILITY

The capacitor according to the present disclosure is likely to have a high capacitance and is thus useful.

What is claimed is:

1. A capacitor comprising:

a first electrode;

a second electrode; and a dielectric disposed between the first electrode and the second electrode, wherein the dielectric includes a compound having an inverted perovskite structure, and the inverted perovskite structure has a portion in which a cation is present at each vertex of corner-sharing octahedra and an anion is present at a center of each of the corner-sharing octahedra.

2. The capacitor according to claim 1, wherein the compound includes an ion of an element in at least one group selected from the group consisting of Group 13, Group 14, and Group 15.

3. The capacitor according to claim 2, wherein the ion has a lone pair.

4. The capacitor according to claim 1, wherein the compound includes at least one selected from the group consisting of $In^+$, $Tl^+$, $Ge^{2+}$, $Sn^{2+}$, $Pb^{2+}$, $Sb^{3+}$, and $Bi^{3+}$.

5. The capacitor according to claim 1, wherein the compound has a composition represented by $DE_2Q_5$, where D and E are each a cation, and Q is an anion.

6. The capacitor according to claim 1, wherein the compound has a composition represented by $DE_2Q_4R$, where D and E are each a cation, and Q and R are each an anion.

7. The capacitor according to claim 1, wherein the compound has a composition represented by $DEGQ_5$, where D, E, and G are each a cation, and Q is an anion.

8. The capacitor according to claim 1, wherein the compound has a composition represented by $DEGQ_4R$, where D, E, and G are each a cation, and Q and R are each an anion.

9. The capacitor according to claim 1, wherein the compound has a composition represented by $DEG_4Q_{10}$, where D, E, and G are each a cation, and Q is an anion.

10. The capacitor according to claim 1, wherein the compound has a composition represented by $DEG_4Q_8R_2$, where D, E, and G are each a cation, and Q and R are each an anion.

11. The capacitor according to claim 1, wherein the compound has a composition represented by $D_3EQ_5$, where D and E are each a cation, and Q is an anion.

12. The capacitor according to claim 1, wherein the compound has a composition represented by $D_3EQ_4R$, where D and E are each a cation, and Q and R are each an anion.

13. The capacitor according to claim 1, wherein the compound has a composition represented by $DE_2GQ_5$, where D, E, and G are each a cation, and Q is an anion.

14. The capacitor according to claim 1, wherein the compound has a composition represented by $D_6EQ_{10}$, where D and E are each a cation, and Q is an anion.

15. The capacitor according to claim 1, wherein the compound has a composition represented by $D_6EQ_8R_2$, where D and E are each a cation, and Q and R are each an anion.

16. The capacitor according to claim 1, wherein the compound has a composition represented by $D_2E_4GQ_5$, where D, E, and G are each a cation, and Q is an anion.

17. The capacitor according to claim 1, wherein the compound has a composition represented by $DE_2GQ_4R$, where D, E, and G are each a cation, and Q and R are each an anion.

18. The capacitor according to claim 1, wherein the compound has a composition represented by $D_2E_4GQ_8R_2$, where D, E, and G are each a cation, and Q and R are each an anion.

19. The capacitor according to claim 1, wherein the compound has a composition represented by $D_2E_4Q_7$, where D and E are each a cation, and Q is an anion.

20. An electrical circuit comprising the capacitor according to claim 1.

21. A circuit board comprising the capacitor according to claim 1.

22. An apparatus comprising the capacitor according to claim 1.

* * * * *